US008824766B2

(12) United States Patent
Bashir et al.

(10) Patent No.: US 8,824,766 B2
(45) Date of Patent: Sep. 2, 2014

(54) SYSTEMS AND METHODS FOR AUTOMATED MAGNETIC RESONANCE IMAGING

(71) Applicant: Duke University, Durham, NC (US)

(72) Inventors: Mustafa R. Bashir, Cary, NC (US); Daniel T. Boll, Durham, NC (US); Elmar M. Merkle, Basel (CH)

( * ) Notice: Subject to any disclaimer, the term of this patent is extended or adjusted under 35 U.S.C. 154(b) by 104 days.

(21) Appl. No.: 13/756,919

(22) Filed: Feb. 1, 2013

(65) Prior Publication Data
US 2013/0208969 A1 Aug. 15, 2013

Related U.S. Application Data

(60) Provisional application No. 61/607,142, filed on Mar. 6, 2012, provisional application No. 61/597,241, filed on Feb. 10, 2012.

(51) Int. Cl.
G06K 9/00 (2006.01)
G06T 7/00 (2006.01)
A61B 5/05 (2006.01)

(52) U.S. Cl.
CPC .............. *G06T 7/0012* (2013.01); *G06T 7/0014* (2013.01); G06T 2207/10088 (2013.01); G06T 2207/30056 (2013.01)
USPC ............................ 382/131; 382/274; 600/410

(58) Field of Classification Search
USPC ......... 382/100, 103, 106, 128–134, 154, 162, 382/168, 173, 181, 199, 224, 232, 254, 274, 382/276, 291, 305, 312; 424/523; 324/309; 600/410; 378/21
See application file for complete search history.

(56) References Cited

U.S. PATENT DOCUMENTS

| 8,605,967 | B2 * | 12/2013 | Dahlqvist Leinhard et al. | 382/128 |
|---|---|---|---|---|
| 2004/0056660 | A1 * | 3/2004 | Yatsui et al. | 324/309 |
| 2005/0215882 | A1 * | 9/2005 | Chenevert et al. | 600/410 |
| 2006/0127491 | A1 * | 6/2006 | Puder et al. | 424/523 |
| 2011/0156704 | A1 * | 6/2011 | Boernert et al. | 324/309 |

OTHER PUBLICATIONS

Bashir, MR et al., Automated Liver Sampling Using a Gradient Dual-Echo Dixon-Based Technique, Magnetic Resonance in Medicine 67:1469-1477 (2012, pp. 1-9.*
Bashir MR, et al., Hepatic MR imaging for in vivo differentiation of steatosis, iron deposition and combined storage disorder: Single-ratio in/opposed phase analysis vs. dual-ratio Dixon discrimination, Eur J Radiol (2011), doi:10.1016/j.ejrad.2011.01.067.
Bashir, MR et al., Hepatic MR Imaging for Differentiation of Biopsy-Proven Steatosis, Iron Deposition, and Combined Disease: One-Dimensional In/Opposed Phase Analysis vs. Two-Dimensional Computer-Aided Dixon Discrimination, slide show presented at ISMRM-ESMRMB Joint Annual Meeting in Stockholm Sweden May 1-7, 2010. 30 slides.
Bashir, MR et al., Automated Liver Sampling Using a Gradient Dual Echo Dixon-Based Technique, manuscript submitted to Magnetic Resonance in Medicine in Jun. 2011, Manuscript ID#MRM-11-12287.R2, pp. 1-60.

* cited by examiner

*Primary Examiner* — Seyed Azarian

(57) ABSTRACT

Disclosed herein are systems and methods for automated MRI. According to an aspect, a method for MRI includes receiving a plurality of MRI data signals representative of a region including a volume of interest. The method also includes determining at least one subvolume within the VOI. Further, the method includes determining a state of the at least one subvolume. The method also includes implementing a predetermined action based on the predetermined state.

26 Claims, 21 Drawing Sheets

US 8,824,766 B2

SYSTEMS AND METHODS FOR AUTOMATED MAGNETIC RESONANCE IMAGING

CROSS REFERENCE TO RELATED APPLICATIONS

This application claims the benefit of U.S. Provisional Patent Application No. 61/607,142, filed Mar. 6, 2012 and titled SYSTEMS AND METHODS FOR AUTOMATED MAGNETIC RESONANCE IMAGING, and U.S. Provisional Patent Application No. 61/597,241, filed Feb. 10, 2012 and titled SYSTEMS AND METHODS FOR AUTOMATED MAGNETIC RESONANCE IMAGING, the disclosures of which are incorporated herein by reference in their entireties.

TECHNICAL FIELD

The presently disclosed subject matter relates to imaging. Particularly, the presently disclosed subject matter relates to systems and methods for automated magnetic resonance imaging (MRI).

BACKGROUND

Magnetic resonance imaging (MRI) is a non-destructive method for the analysis of materials. It is generally non-invasive and does not involve ionizing radiation. In very general terms, nuclear magnetic moments are excited at specific spin precession frequencies which are proportional to the local magnetic field. The radio-frequency signals resulting from the precession of these spins are received using receiver coils. By manipulating the magnetic fields, an array of signals is provided representing different regions of the volume. These are combined to produce a volumetric image of the nuclear spin density of the body.

Magnetic resonance (MR) is an accurate, noninvasive tool for assessment of diffuse hepatic deposition disease, namely hepatic steatosis and iron overload. A variety of MR-based techniques are available for detection and characterization of hepatic deposition disease, including dual echo technique, multi-echo acquisition, and breathhold single voxel or volumetric spectroscopy. The primary advantages of these techniques over percutaneous liver biopsy, the reference standard for deposition disease, include evaluation of a much larger volume of tissue, lower cost, and lack of periprocedural complications associated with biopsy.

MR-based techniques for evaluation of hepatic deposition disease ultimately rely on manual selection of a region of interest (ROI) or volume of interest (VOI) for analysis of a particular portion of the hepatic parenchyma, prior to or following data acquisition. It would be beneficial to provide techniques for automating one or more of the processes related to magnetic resonance imaging and diagnosis. More particularly, it would be beneficial to provide techniques for automating processes related to magnetic resonance imaging of liver and diagnosis of liver conditions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Disclosed herein are systems and methods for automated MRI. According to an aspect, a method for MRI includes receiving a plurality of MRI data signals representative of a region including a volume of interest. The method also includes determining at least one subvolume within the VOI. Further, the method includes determining a state of the at least one subvolume. The method also includes implementing a predetermined action based on the predetermined state.

BRIEF DESCRIPTION OF THE DRAWINGS

The foregoing summary, as well as the following detailed description of various embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
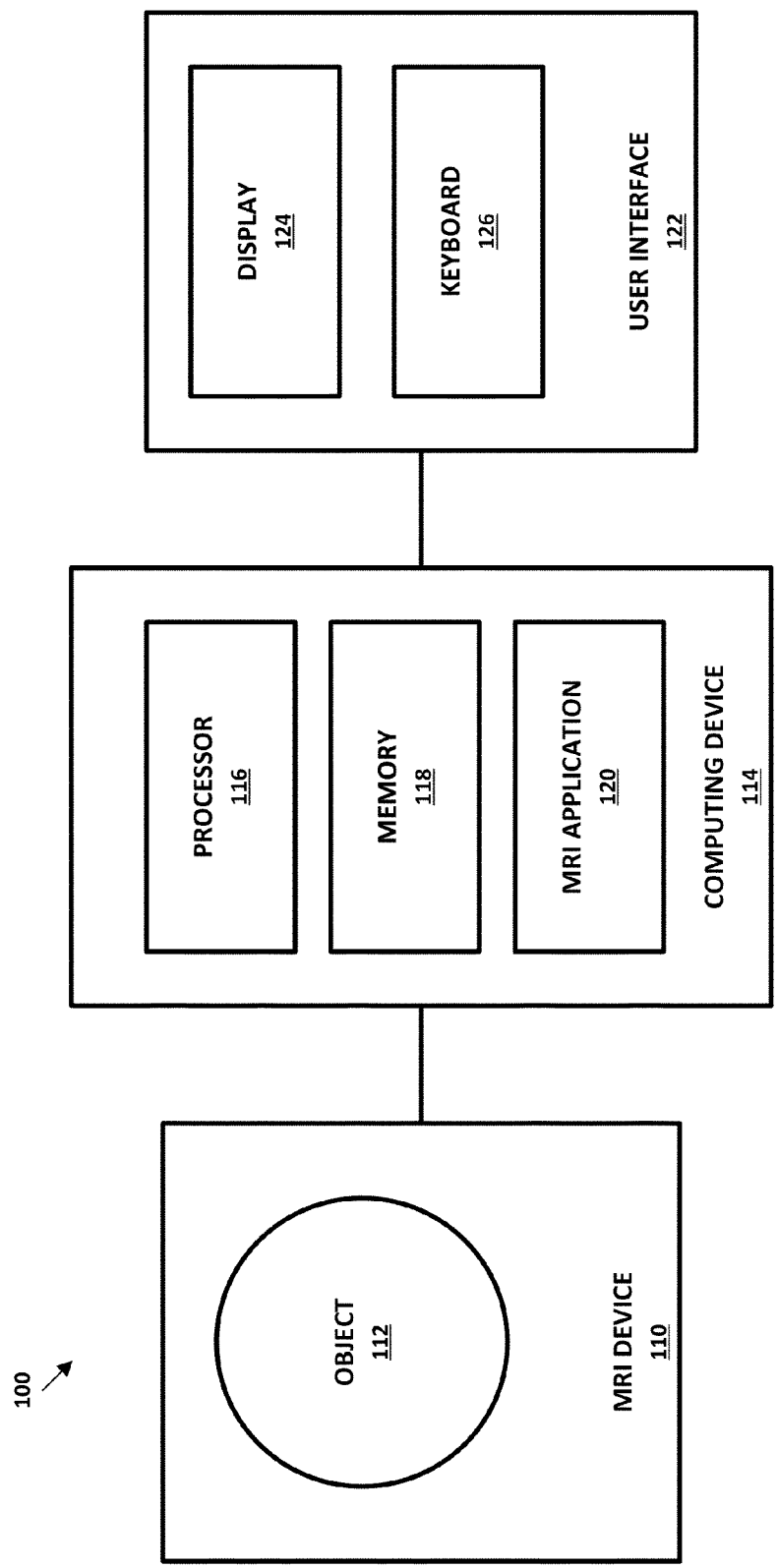
FIG. 1 is a block diagram of an MRI system in accordance with embodiments of the present disclosure.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

The present disclosure provides systems and methods for automating one or more of the processes related to magnetic resonance imaging and diagnosis. More particularly, the present disclosure provides systems and methods for automating processes related to magnetic resonance imaging of liver and diagnosis of liver conditions. In accordance with embodiments of the present disclosure, workflow in spectroscopy may be optimized by automating liver volume selection to allow acquisition to proceed without the direct involvement of an MR physicist or physician. In multi-echo paradigm, where ROI selection occurs after data acquisition and processing, automated liver selection may provide a global overview of disease without the need for time-consuming manual placement of ROIs in numerous sites throughout the liver. This data may be presented to the viewer, shortening the time needed for exam interpretation.

The present disclosure provides methods that may be implemented by a scanner console during an MR examination for presentation of images and diagnosis information. As a result, decisions based on the image and diagnosis information may be made immediately. For example, decisions requiring selection of portions of the hepatic parenchyma may be made immediately. It is noted that diffuse hepatic deposition disease, though heterogeneous in severity, may be found throughout large portions of diseased liver. Therefore, applying techniques disclosed herein to the imaging of diffuse hepatic deposition disease may not require selection of the entire liver volume, but rather a relatively large, representative sample of hepatic parenchyma. Therefore, this selection process may be different than a traditional segmentation problem.

The presently disclosed subject matter may utilize a technique for gradient dual echo MRI with two-point Dixon reconstruction. This technique may be used for assessment of diffuse liver disease. The signal intensity ratios derived from this technique (in-phase/opposed phase and fat-only/water-only) follow predictable patterns in both the presence and absence of deposition disease. A liver volume selection methodology based on these ratio pairs may take advantage of the intrinsic behavior of hepatic parenchymal signal, rather than relying on simple thresholds or complex probabilistic models.

In accordance with embodiments, a method for fully automated/sampling of a VOI, such as the liver, is provided. In an example, the method may be based in part on the 3D dual gradient echo pulse sequence with fat-water suppression (e.g., two-point Dixon reconstruction). The method may use four data image sets generated by the pulse sequence (e.g., in-phase, opposed phase, fat-only, and water only) and may take advantage of the predictable behavior of the signal intensity of the VOI (e.g., liver) on these sequences. For cases where the liver is the VOI, these behaviors can also give a preliminary determination as to whether significant liver fat is present, as well as liver iron, a disease state which often coexists with NAFLD.

In accordance with embodiments, a method may divide the image data set into subvolumes, then characterize each subvolume according to signal intensities measured within that subvolume on the VOI, groups them, and yields a final volume located within the region of interest. Depending on the exact parameters utilized, the method may run in only 15-70 seconds, fast enough to run in the background of an MRI scanner console during the scan. If a disease state is detected, the method can output a message to the scanner console warning the performing technologist that a disease state may be present, and setting up a spectroscopy sequence for confirmation, with automatic detection of the spectroscopy VOI.

In an example, a method as disclosed herein may include two basic components: ability to automatically select a portion of a VOI for preliminary analysis, where the volume is then translated into the spectroscopy VOI in a fully automated way, obviating the need for direct physician intervention at the time of the scan; and preliminary analysis of the VOI using the fat-water separation (e.g., two-point Dixon technique) data sets already obtained, in order to determine whether a liver deposition disease state (e.g., NALFD, iron deposition, or both) may be present. The performing technologist can then be alerted to run a spectroscopy sequence for more detailed characterizations.

An example advantage of the disclosed subject matter includes improving workflow. For example, a method may detect patient in whom the liver deposition disease is likely to be present and may trigger a confirmatory spectroscopy scan for more detailed characterization. A scan may be performed in only patients who might have disease, since the additional scan may require additional scan time and may not be feasible to perform in every patient. In another example, the method may set up the VOI in an automatic way, which may allow for the technologist to continue scanning without requiring a physician to come to the scanner to set up the VOI.

Another example benefit is that every time a patient undergoing a liver MRI may be simultaneously screened for NAFLD. Since this disease is so prevalent and often does not come to clinical attention before evolving into irreversible cirrhosis, a screening tool can be very valuable from a public health standpoint. This may allow patients to enter the care of hepatologists much earlier in their disease, when treatment and even disease reversal may be possible.

Articles "a" and "an" are used herein to refer to one or to more than one (i.e., at least one) of the grammatical object of the article. By way of example, "an element" means at least one element and can include more than one element.

As used herein, the terms "subject" and "patient" are used interchangeably herein and refer to both human and nonhuman animals. The term "nonhuman animals" of the disclosure includes all vertebrates, e.g., mammals and non-mammals, such as nonhuman primates, sheep, dog, cat, horse, cow, chickens, amphibians, reptiles, and the like.

The following examples are included to demonstrate specific embodiments of this disclosure. It should be appreciated by those of skill in the art that the techniques disclosed in the examples that follow represent techniques discovered by the inventors to function well in the practice of the present disclosure, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the present subject matter.

FIG. 1 illustrates a block diagram of an MRI system 100 in accordance with embodiments of the present disclosure. Referring to FIG. 1, the system 100 may include an MRI device 110. The MRI device 110 may be configured for scanning and capturing an image of an object 112 such as an anatomical image of an object. Example objects to be imaged include, but are not limited to, liver tissue, brain tissue, kidney tissue, heart tissue, and other bodily tissues. The MRI system may include a computing device 114 having communicative connection to the MRI device 110. The computing device 114 may include a processor 116, a memory 118, and an MRI application 120 that is configured to execute on the processor 116. The MRI system 110 may include a user interface 122, such as an image generator, that is configured to display images on a display 124 and to receive user input through a user input device, such as, for example, a keyboard 126.

Figure 2:
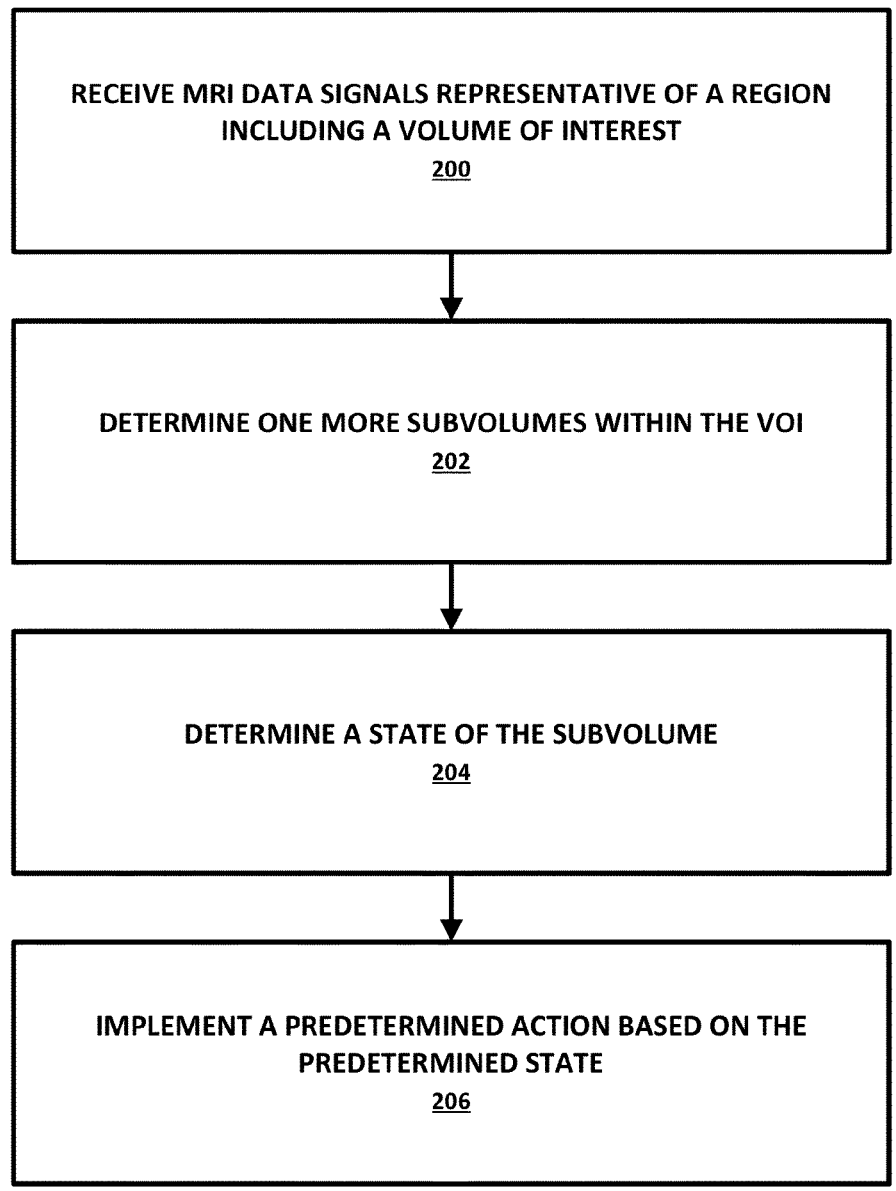
FIG. 2 is a flowchart of an example method of MRI imaging in accordance with embodiments of the present disclosure.

FIG. 2 illustrates a flowchart of an example method of MRI imaging in accordance with embodiments of the present disclosure. The method of FIG. 2 is described as being implemented by the MRI system 100 shown in FIG. 1; however, this example method should not be considered so limiting as the method may be applied to any suitable MRI system or other imaging system.

Referring to FIG. 2, the method includes receiving MRI data signals representative of a region including a volume of interest (VOI) (step 200). The MRI system 100 may be used to acquire image echoes of the object 112. The object may be the entirety or a portion of liver tissue or any other bodily tissue. The MRI system 100 may apply a magnetic field to the object 112. The imaging data may be acquired at multiple data points, including, for example, acquiring image data of the object 112 at multiple orientations of the object 112 relative to a magnetic field generated by the MRI system 100. Further, the imaging data may be acquired continuously. A three-dimensional (3D) pulse sequence may be applied to a region for obtaining the MRI signals. The MRI system 100 may acquire image echoes by any suitable technique such as, but not limited to, spin wrap, interleaved spiral, and segmented EPI trajectories. In an example, the MRI device 110 may generate MRI data signals based on the acquired imaging data and communicate the MRI data signals to the computing device 114. The MRI data signals may include one or more of an in-phase data set, an opposed-phase data set, a fat-only data set, and a water-only data set. The MRI application 120 may receive the MRI data signals and store the data in memory 118.

The method of FIG. 2 includes determining one or more subvolumes within the VOI (step 202). In an example, the MRI application 110 may identify the VOI by any suitable technique, including the method of FIG. 3 or any other suitable image segmentation or sampling method. Subsequently, the MRI application 110 may determine multiple subvolumes within the VOI. One or more of the subvolumes of interest may be determined based on a signal intensity of the subvolume(s).

The method of FIG. 2 includes determining a state of the subvolume (step 204). For example, the determined subvolume(s) may be compared to model data of the VOI that corresponds to the determined subvolume(s). A state of the subvolume(s) may be determined based on the comparison. As an example, the state may be determined by applying a fat-water separation technique to the subvolume(s). A liver deposition state may be determined based on the applied fat-water separation technique.

The method of FIG. 2 includes implementing a predetermined action based on the predetermined state (step 206). For example, the MRI application 120 may determine a level of a liver fat and/or liver iron of a patient's liver. A liver deposition disease state may be determined based on the level of the liver fat and/or liver iron of the liver. A predetermined action may include indicating the level to a user. For example, the MRI application 120 may control the display 124 to present the level to a user.

In accordance with embodiments of the present disclosure, implementing a predetermined action may include presenting an image of a subvolume, presenting a recommendation and/or or modifying subsequent portions of the MRI scan. For example, the display 124 shown in FIG. 1 may be controlled to display an image of one or more subvolumes of a liver. In another example, the display 124 may be controlled to present a diagnosis or patient treatment recommendation based on an analysis of one or more subvolumes.

In accordance with embodiments of the present disclosure, a computer-implemented method is provided that takes advantage of predictable patterns in signal intensity ratios derived from a two-point Dixon technique, in order to automatically select large portions of an image volume located within the liver for analysis. In an experiment, a hypothesis was tested that such a method may consistently select sizable volumes of the hepatic parenchyma for subsequent analysis with no human intervention, regardless of the presence or absence of deposition disease. An example benefit is that workflow can be improved by allowing the automated selection of a large representative portion of the hepatic parenchyma for analysis and calculation during MRI, without radiologist intervention.

In one study, one hundred consecutive liver MRI examinations were performed at a tertiary care center in patients with an without known diffuse hepatic deposition disease (26 with hepatic steatosis, 14 with iron deposition, 3 with both, 57 with neither) were selected, in order to assure that the algorithm functioned properly in both the presence and absence of these disease states. The presence or absence of deposition disease was based on clinical liver biopsies performed during routine clinical care, within three months of MRI. These included 83 patients (47 women) with a mean age of 51.8 years (range 19-82). One patient had four examinations, two patients had three examinations, ten patients had two examinations, and the remaining 70 patients underwent a single examination each. All repeat examinations were performed at least one month apart. Image data was acquired at both 1.5 T (n=78; Magnetom Avanto—A TIM System, Siemens Medical Solutions, of Erlangen, Germany) and 3 T (n=22; Magnetom Trio—A TIM System, Siemens Medical Solutions, of Erlangen, Germany). MRI systems were equipped with high-performance gradients and utilized six-channel torso phased-array coils as well as the table-mounted spine matrix coils. The imaging protocol included a three-dimensional parallel-accelerated in- and opposed-phase Volumetric Interpolated Breath-hold Examination (VIBE) sequence with two-point Dixon reconstruction, using the following parameters. At 1.5 T, TR was 7.48 ms, TEopposed-phase 2.38 ms, TEin-phase 4.76 ms, flip angle 10°, readout bandwidth 290 Hz/pixel, matrix 256×192, slice thickness 3 mm, parallel acceleration factor of 2. At 3 T, TR was 3.91 ms, TEopposed-phase 1.225 ms, TEin-phase 2.45 ms, flip angle 7°, readout bandwidth 850 Hz/pixel, matrix 256×256 slice thickness 3 mm, parallel acceleration factor of 2. Total breath hold time was approximately 20-25 seconds at both field strengths.

Figure 3:
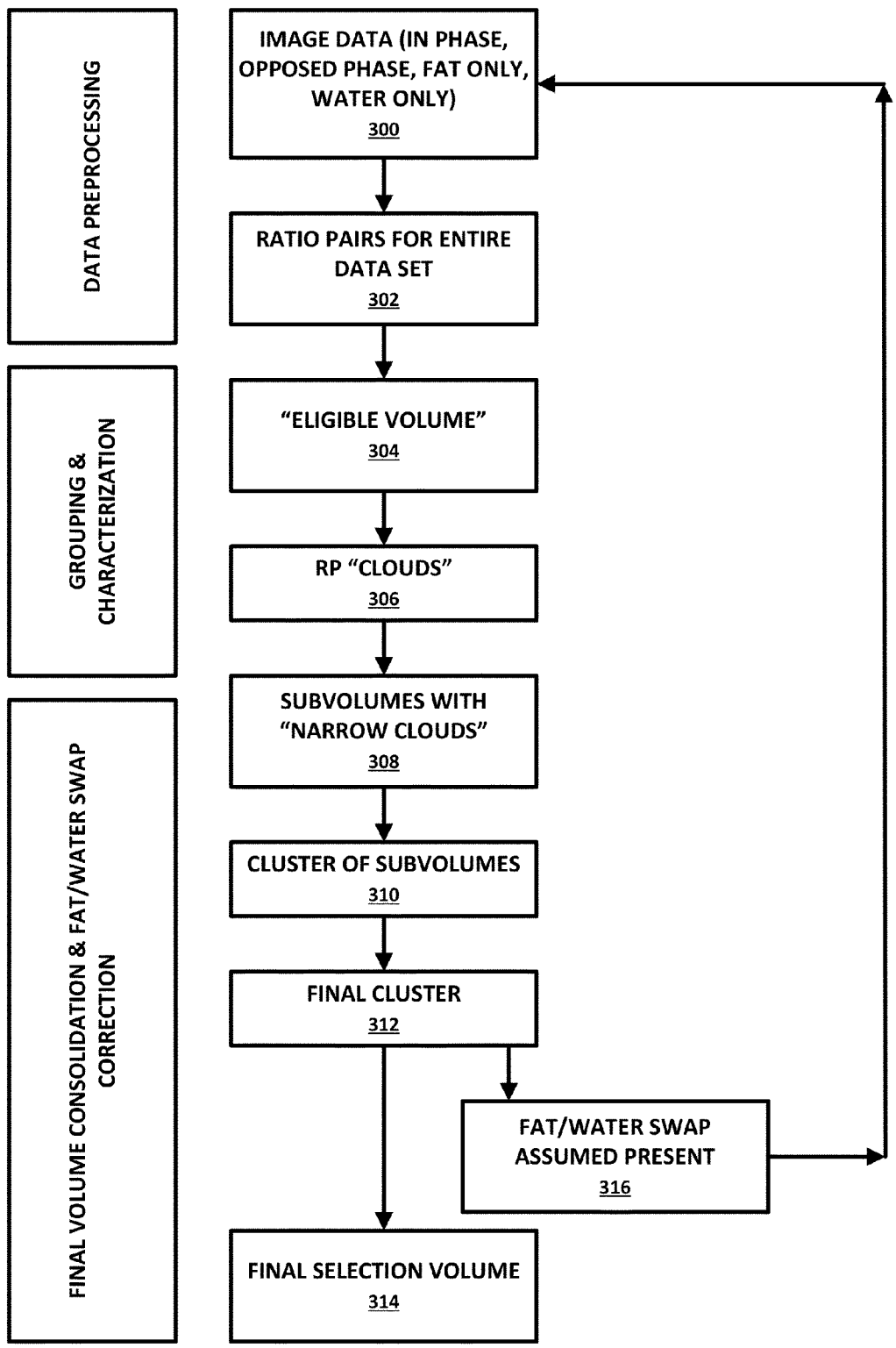
FIG. 3 is a flow chart of an example method for image processing in accordance with embodiments of the present disclosure.

FIG. 3 illustrates a flow chart of an example method for image processing in accordance with embodiments of the present disclosure. This example method is particularly a liver parenchyma sampling algorithm, and may be implemented by the MRI application 120 shown in FIG. 1 or any suitable computing device. Referring to FIG. 3, the example method may begin at step 300 in which image data may be received and an RP is calculated for each voxel. It is noted that the term ratio pair (RP) herein may refer to each pair of numbers calculated for a given voxel location, based on the four image data sets generated by, for example, a two-point Dixon technique (in-phase, opposed-phase, fat-only, and water-only data sets), as described below. The quotients fat-only/water-only (F/W) and log in-phase/opposed-phase (I/O) may follow a generally logarithmic relationship. Subsequently, image data may be transformed into RPs on a voxel-by-voxel basis by calculating F/W and the natural log of I/O (ln [I/O]). Analysis performed directly on the RPs may be considered to occur in "RP space." RPs may be calculated for each voxel location in the image volume in accordance with the following equations:

$$IO = \ln(\text{In-phase/Opposed-phase})$$

$$FW = \text{Fat-only/Water-only} \qquad (1)$$

$$RP = (IO, FW)$$

For grouping and characterization, the volumetric image data may be divided into subvolumes of predetermined size along standard gridlines in three dimensions, covering the right and mid-abdomen and spaced according to the specified subvolume size in the axial plane; the height of the subvolume along the z-axis direction was chosen empirically as 10% of the height of the entire 3D volume. This division into subvolumes (referred to herein as "gridding," since subvolume boundaries may be defined using a uniform rectilinear grid) may be conducted at the beginning of the method and may result in the inclusion of some gas-containing voxels. Voxels for which signal intensity on the water-only data set was equal to zero may be discarded, eliminating many of the voxels containing either gas or susceptibility artifact.

RPs corresponding to voxels within each subvolume may be termed a "cluster" or "cloud" of RPs. Those clusters containing RPs falling outside of the expected range for the liver may be rejected. Further, clusters containing RPs which were initially rejected based on corresponding water-only values of zero may be rejected, as their intensity characteristics may be presumed to be contaminated by susceptibility effects. In this way, RPs outside established liver values may be eliminated to obtain an "eligible volume" of voxels (step 304).

Figure 4:
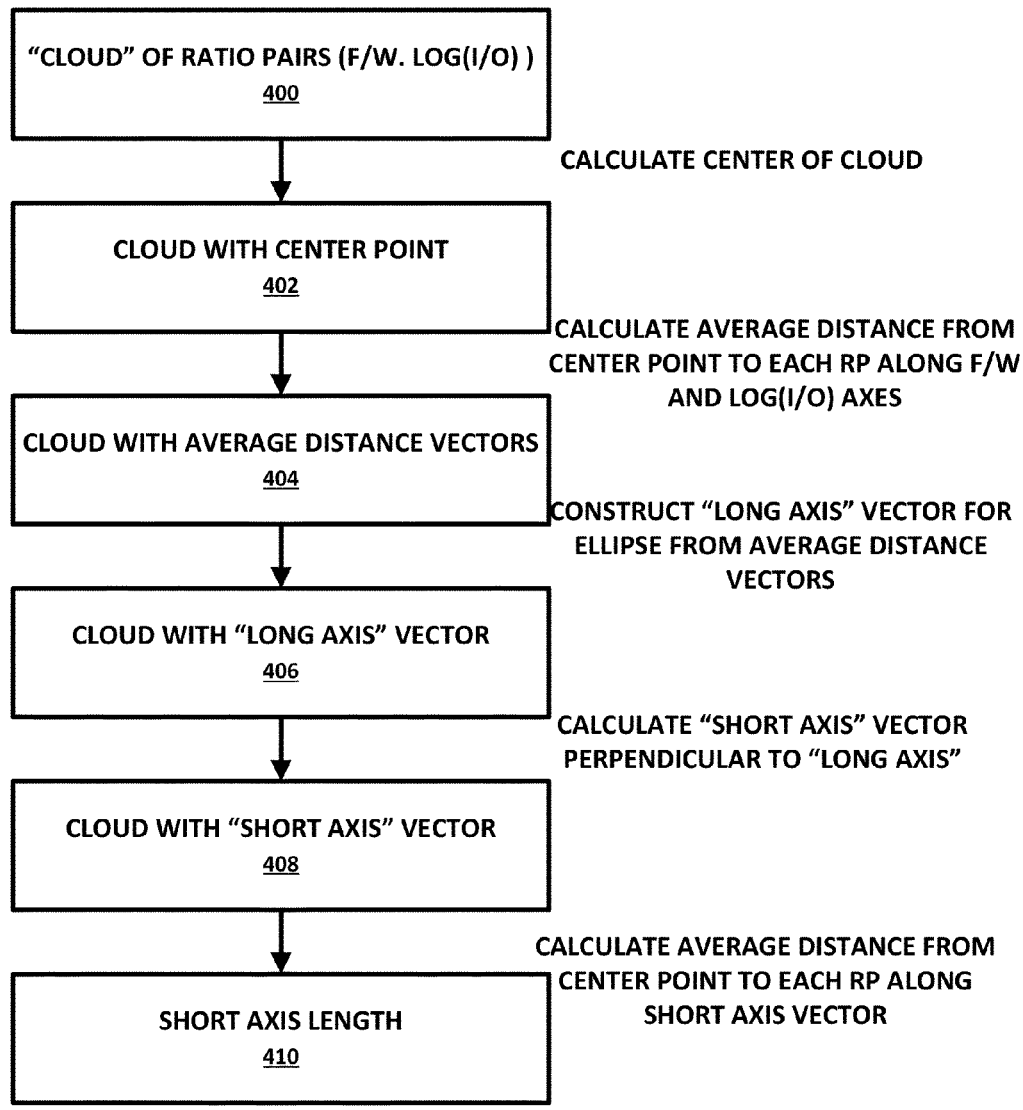
FIG. 4 is a flow chart of an example method of calculating a short axis length of an ellipse representing each RP cluster in accordance with embodiments of the present disclosure.

Each remaining cluster or cloud of RPs may be characterized in the RP space (step 306) in accordance with FIG. 4, which illustrates a flow chart of an example method of calculating a short axis length of an ellipse representing each RP cluster in accordance with embodiments of the present disclosure. Each cluster may be represented by a long axis length with a perpendicular short axis length.

Figure 5:
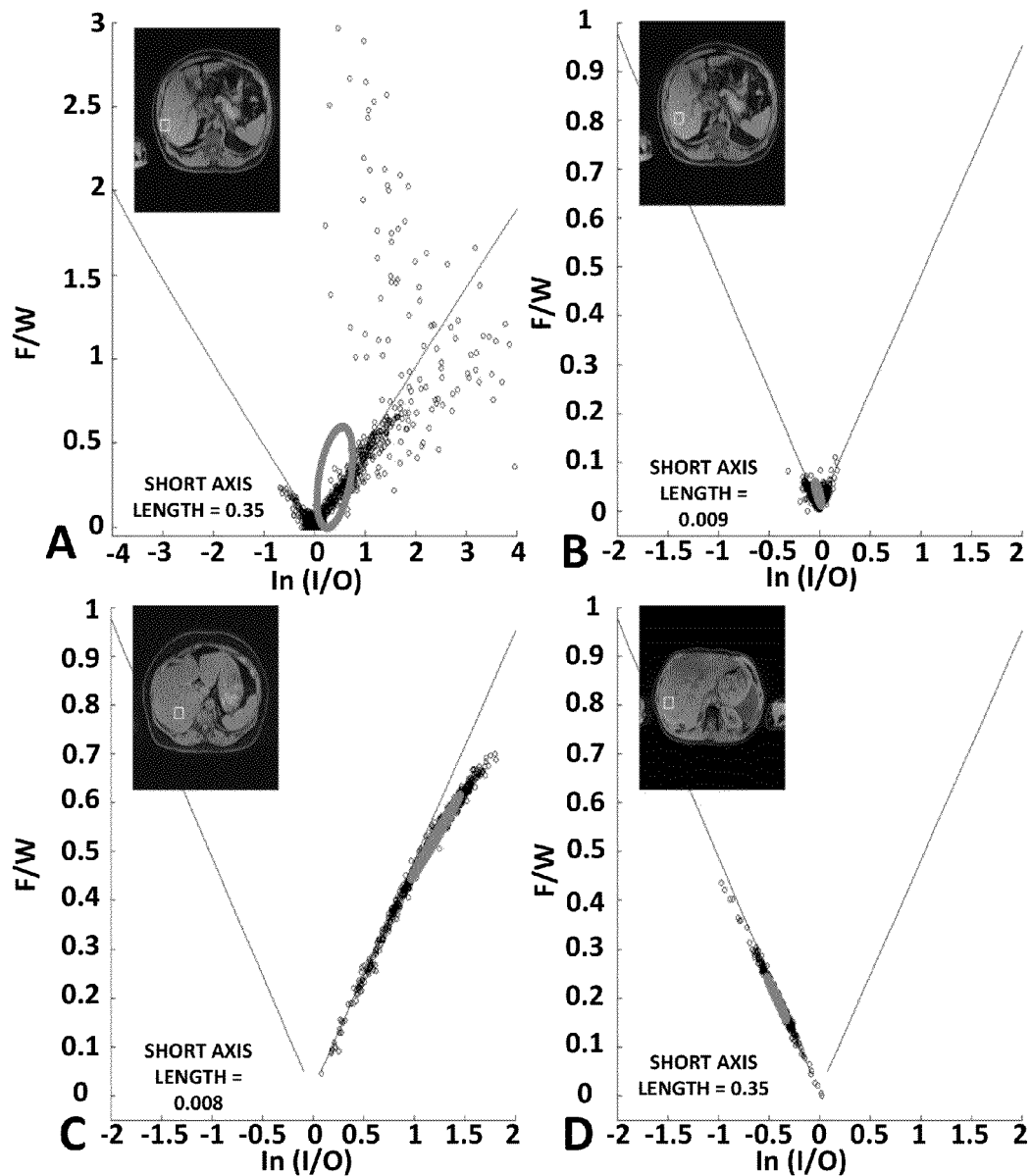
FIG. 5 depicts graphs of "clusters" of ratio pairs (RP space) corresponding to F/W and log(I/O) calculated for each voxel location within a region of interest.

The mean and standard deviation of the short axes for all remaining clusters of RPs may be calculated. All clusters with short axis length greater than one standard deviation below the mean of all short axis lengths for the remaining clusters (referred to as "wide" clusters) may be rejected, while those with smaller short axes may be accepted. For example, FIG. 5 depicts graphs of "clusters" of ratio pairs (RP space) corresponding to F/W and log(I/O) calculated for each voxel location within a region of interest. Insets show water-only images from two-point Dixon data sets with regions of interest indicated by white squares. Referring specifically to FIG. 5A, this graph shows a region of interest not located completely within the liver, resulting in a "wide" cluster of RPs with a corresponding large short axis. FIG. 5B shows a normal liver. FIG. 5C shows a fatty liver. FIG. 5D shows iron overloaded liver with regions of interest completely within the liver, with resultant small short axis lengths. Those "wide" clusters with a relatively large short axis length were assumed to be contaminated by extrahepatic tissue such as fat, bone cortex, bowel gas, and the like (as shown in FIG. 5A).

Subvolumes corresponding with the accepted RP clusters may be grouped into blocks, with each block consisting of a group of subvolumes positioned adjacent to each other in the image data space. Two subvolumes may be considered adjacent to each other if they shared a common face, and not if they merely shared a common edge or vertex (i.e., no diagonals). The largest contiguous block of adjacent subvolumes may be accepted as representing the liver (step 308), and outlying subvolumes removed by location to consolidate the block (step 310) to generate a final selection volume 312.

Subsequently, a calculation may be performed to determine whether the final block of subvolumes was located in the expected region of the liver (step 314). This may be performed by assigning a weighting factor for each subvolume according to its distance from the approximate right upper quadrant (a point 40% of the z-axis length from the cranial limit of the image volume, 40% of the mediolateral field of view length from the right border of the image volume, and halfway between the anterior and posterior borders of the volume (e.g., this location may be determined by trial-and-error across numerous data sets) and totaling the weighting factors for all subvolumes in the final block. The weighting factor may be defined by the following equation:

$$WF = \frac{1}{\sqrt{(SV_x - \text{Center}_x)^2 + (SV_y - \text{Center}_y)^2 + (SV_z - \text{Center}_z)^2}} \qquad (2)$$

where $SV_x$, $SV_y$, and $SV_z$ define the location of the center of the subvolume in the Cartesian coordinate system defined by the gridding scheme in the initial portion of the algorithm, and $\text{Center}_x$, $\text{Center}_y$, and $\text{Center}_z$ are the coordinates of the center of the approximate right upper quadrant as defined herein above.

The example algorithm assumes the position in the liver in the right upper abdominal quadrant, and although it is noted that the algorithm may require modification in cases of situs inversus, the vast majority of patients (>99.9%) do have conventional anatomy as assumed here.

If the total of the weighting factors is small (defined as <10 based on trial-and-error), i.e. the final block of subvolumes was not generally in the right upper quadrant, a complete fat/water swap may be assumed to have been present in the original image data (step 316). The fat and water data sets may be exchanged and the algorithm rerun by returning to step 300. After the second run, the total of weighting factors for the first and the second runs may be compared; the run with the larger total was considered to have selected subvolumes closer to the right upper quadrant and was assumed to have been based on the data set with the correct fat/water assignment. Its corresponding block of subvolumes was accepted as the final liver sample volume.

In an experiment, the algorithm was run for each image data set using a variety of predetermined subvolume gridding sizes (corresponding to 15, 10, 7, and 5 voxels in anteroposterior and mediolateral dimensions, with the height along the z-axis held constant) in order to compare the effect of varying the sizes of the subvolumes.

Figure 6:
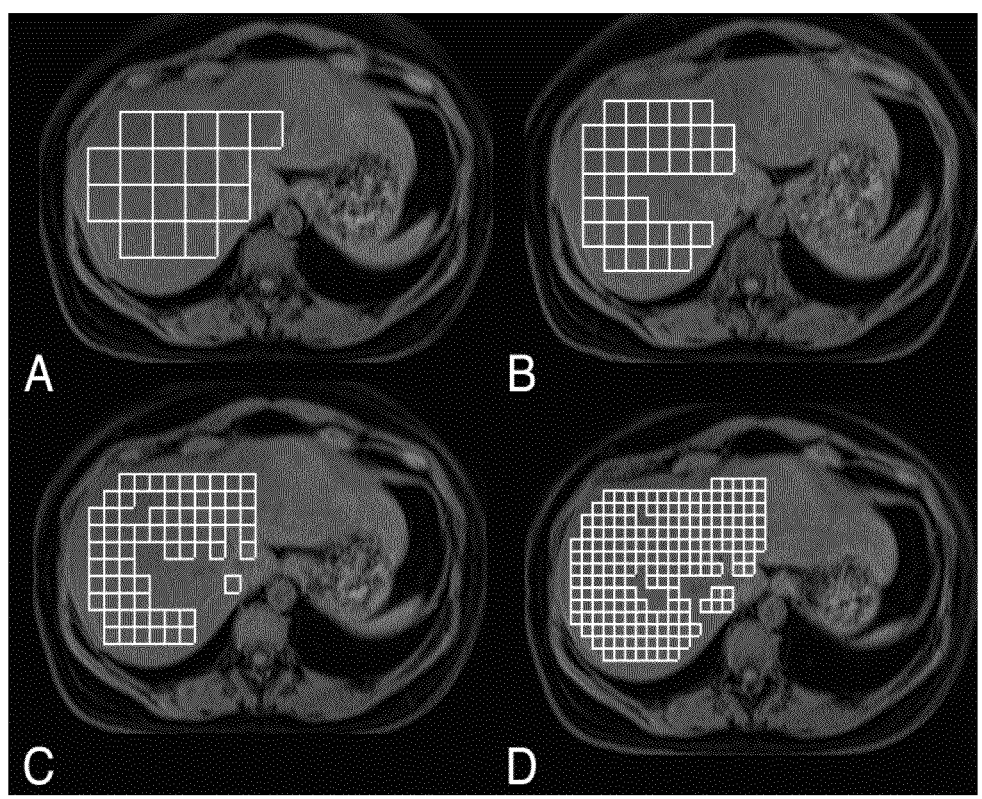
FIG. 6 illustrates image maps demonstrating individual levels from the final volumes selected by the algorithm at subvolume sizes of 15 voxels, 10 voxels, 7 voxels, and 5 voxels.

Image maps displaying the final block of subvolumes drawn over the water only images were generated as shown in FIG. 6, which illustrates image maps demonstrating individual levels from the final volumes selected by the algorithm (enclosed in white boxes) at subvolume sizes of 15 voxels (FIG. 6A), 10 voxels (FIG. 6B), 7 voxels (FIG. 6C), and 5 voxels (FIG. 6D). It is noted that the isolated subvolumes adjacent to the inferior vena cava in FIGS. 6C and 6D, wherein these subvolumes were accepted based in part on contiguity with the remainder of the accepted subvolumes via shared faces with subvolumes located cranially in the image data sets (not shown). The selected subvolumes were categorized visually as follows: entirely within the liver (excluding main portal vein, inferior vena cava, and focal lesions, liver score=1); partially within the liver (containing greater than 10% voxels inside and greater than 10% outside the liver, liver score=0.5); and entirely outside the liver (including main portal vein, inferior vena cava, and focal lesions, liver score=0). The total volume of the final sampling block was calculated. The correct volume selected was calculated as the sum of the volume of each selected subvolume multiplied by that subvolume's liver score. The incorrect volume selected was considered to be the difference between the total volume selected and the correct volume selected. While these 10% criteria may not permit precise determination of the correct, incorrect, and total volumes selected, they may be considered a rough measure of the general accuracy of the algorithm. The use of these gross criteria may be needed in order to enable rapid visual evaluation of the large number of subvolumes defined by the algorithm.

For each image data set, run time of the algorithm was recorded as executed on a 2.4 GHz 64-bit dual-processor 6 gigabyte RAM system (Xeon, Intel, of Santa Clara, Calif.) employing the MATLAB® environment (e.g., Matlab version R2009b, Image Processing Toolbox version 6.4, available from MathWorks Inc., of Natick, Mass.). The percentage of sample in the liver was calculated as the correct volume selected divided by the total volume selected.

Due to the Dixon algorithm's inability to correctly identify the in-phase and opposed-phase data sets using image features along, it may occasionally incorrectly designate the fat-only data set as water-only, and vice versa. This is known as a complete fat/water swap and was visually identified in 3/100 data sets that were analyzed. In order to assess the algorithm's ability to detect such a misassignment, a warning was generated by the algorithm each time it concluded that a complete fat/water swap was present. The algorithm was run on all 100 data sets and its determination as to the presence of a complete swap was compared with visual analysis of the source images. Subsequently, the fat-only and water-only images were intentionally reversed in all 100 data sets and the algorithm rerun, with its determination as to the presence of a complete swap again compared against visual analysis.

Table 1 below shows average algorithm run time, volume selected, correct liver volume selected, percentage of sample in the liver, and incorrect volume selected for all image data sets separated by subvolume size.

TABLE 1

| Subvolume Size | $15^2$ Voxels | $10^2$ Voxels | $75^2$ Voxels | $5^2$ Voxels |
|---|---|---|---|---|
| Run Time | 19.7 ± 6.5 s | 23.6 ± 7.0 s | 33.9 ± 10.4 s | 79.0 ± 22.8 s |
| Volume Selected | 543 ± 249 mL | 597 ± 254 mL | 636 ± 235 mL | 768 ± 262 mL |
| Correct Liver Volume Selected | 527 ± 229 mL | 580 ± 238 mL | 615 ± 230 mL | 733 ± 257 mL |
| % of Sample in Liver | 97.0 ± 8.1% (57.1 – 100%) | 97.1 ± 7.4% (60.5 – 100%) | 96.7 ± 8.4% (61.0 – 100%) | 95.4 ± 9.1% (52.9 – 100%) |
| Incorrect Volume Selected | 17 ± 71 mL (0 – 606 mL) | 17 ± 70 mL (0 – 514 mL) | 21 ± 61 mL (0 – 390 mL) | 35 ± 86 mL (0 – 697 mL) |

Table 1 provides results of the liver selection algorithm run on 100 two-point Dixon data sets, using subvolumes of varying sizes for analysis. Values are given as mean±standard deviation, with the range given as (lowest value-highest value) where applicable. Representative image maps from the final volumes selected for a single patient at one level are shown in FIG. 6, using four possible subvolume sizes. The above characteristics are shown for the 7-voxel gridding scheme shown in Table 2 below, separated according to the histologically-determined presence or absence of diffuse deposition disease.

TABLE 2

| Subvolume Size | $15^2$ Voxels | $10^2$ Voxels | $75^2$ Voxels | $5^2$ Voxels |
|---|---|---|---|---|
| Run Time | 34.3 ± 10.4 s | 34.0 ± 11.8 s | 30.3 ± 6.3 s | 43.9 ± 7.9 s |
| Volume Selected | 632 ± 237 mL | 648 ± 188 mL | 619 ± 300 mL | 699 ± 356 mL |
| Correct Liver Volume Selected | 614 ± 227 mL | 641 ± 182 mL | 561 ± 296 mL | 621 ± 409 mL |
| % of Sample in Liver | 97.7 ± 5.6% (61.0 – 100%) | 99.2 ± 2.9% (85.1 – 100%) | 89.7 ± 14.7% (61.5 – 99.7%) | 87.0 ± 22.3% (61.3 – 100%) |
| Incorrect Volume Selected | 18 ± 55 mL (0 – 398 mL) | 7 ± 26 mL (0 – 132 mL) | 58 ± 101 mL (3.2 – 366.3 mL) | 78 ± 135 mL (0 – 234 mL) |

Table 2 shows the results of the liver selection algorithm run on 100 two-point Dixon data sets, using the 7 voxel subvolume size, separated by the histopathological presence and type of diffuse deposition disease. Values are given as mean±standard deviation, with the range given as (lowest value-highest value) where applicable.

In general, the volume selected and correct liver volume selected increased as subvolume size decreased. Visually, it was observed that the smaller subvolumes were better able to fill the rounded liver contour, resulting in selection of a larger portion of the liver. However, the percent of the sampled volume actually located within the liver decreased slightly, and the incorrect volume selected as subvolume size became smaller. These trends were observed both in aggregate and in most (though not all) individual subjects.

Selection of extrahepatic subvolumes was seen most frequently in examinations complicated by motion artifact and in patients with large amounts of ascites and iron deposition, where the signal intensity of the liver on both in- and opposed-phase imaging was similar to that of the surrounding fluid. This resulted in the incorrect sampling of ascites or adjacent soft tissue structures, which may not be resolved from the liver due to blurring/motion. Specifically, failures of the algorithm (defined arbitrarily as <90% of final volume inside the liver) occurred for the 7-voxel gridding scheme in 8/100 cases and were associated with at least one of the following factors: moderate or greater ascites (n=7), marked iron deposition (n=3), and severe motion (n=2). These cases were retained in the analysis as the study population was intended to represent a typical sample of the cases encountered in routine clinical abdominal MRI. These cases were also the cause of the relatively large ranges of values for "% of Sample in Liver" and "Incorrect Volume Selected" in Tables 1 and 2. Due to the small number of algorithm failures associated with any individual factor, a separate analysis of the specific effects of each factor was not performed.

For all pairings of subvolume sizes the total volumes selected as well as the correct volumes selected were different at a statistically significant level (range $p<0.05$-$p<0.001$). Differences between incorrect volume selected were not statistically significant when comparing the 15, 10, and 7 voxel subvolume sizes (range $p=0.15$-$p=0.67$), while the incorrect volume selected for the 5 voxel subvolume size was greater compared with the larger subvolume sizes at a statistically significant level ($p<0.001$ for all).

Algorithm run time rose for progressively smaller subvolume sizes, due to the increase in the number of subvolumes which were characterized during the course of calculation.

Notably, the algorithm excluded some subvolumes which contained portions of larger vessels (including the hepatic veins and right portal vein), though this was inconsistent from data set to data set. Smaller vessels did not generally alter the RP characteristics of their corresponding subvolumes to an extent great enough to cause exclusion of those subvolumes.

In terms of complete fat/water swap detection, the algorithm correctly detected all three of the data sets in which a complete swap was present, while correctly concluding that no swap was present in the remaining 97 data sets. After manually switching the fat-only and water-only data sets, the algorithm correctly detected the swap in all 97 data sets in which it was present. It furthermore correctly determined that no swap was present in the remaining three data sets.

In accordance with embodiments, the present disclosure provides a fully-automated technique for selection of a large sample of the liver from dual-echo image data sets, for subsequent analysis for diffuse deposition disease. This ratio-pair based technique results in the accurate selection of large samples of hepatic parenchyma for analysis. A variety of liver segmentation techniques have been investigated, which typically attempt to extract the entire liver volume from an image data set. These employ a number of techniques, including deformable models, statistical/probabilistic techniques, atlas-guided methods, and basic image processing/thresholding, among others; ultimately, simple threshold- and model-based techniques predominate. However, many of these techniques may be time-consuming, are not fully automated, and require dedicated post-processing workstations with special software.

In accordance with embodiments of the present disclosure, a technique is provided that relies on ratio pair values in the liver falling into a predictable range, in both the presence and absence of diffuse deposition disease. The ratio pairs corresponding to non-hepatic voxels (in particular, fat, blood vessels, bowel gas, and bone cortex) tend to fall outside of the expected range. Characterization of the cluster of RPs corresponding with a whole subvolume allows for the rejection of subvolumes containing extrahepatic tissues, as quantified by the "width" (short axis length) of an ellipse representing the RP cluster. Limiting the analysis to the width of the cluster allows acceptance of subvolumes which contain a range of RPs corresponding to varying amounts of deposition disease. In order words, the cluster for a subvolume containing voxels corresponding to both mild and severe disease (such as hepatic steatosis) may have a relatively small short axis dimension, since the RPs follow the same logarithmic relationship, despite large variations in the actual RP values (a long but narrow cluster, as shown in FIGS. 5C and 5D). This technique may rely on the intrinsic behavior of MR signal arising from the liver, rather than simple thresholds or statistical modeling.

This algorithm may employ an element of thresholding, in that voxels with a zero value on the water-only data set are rejected out of hand. While there may be value to raising this threshold to additionally exclude low-level noise, it was observed that the RPs calculated in the areas of low-level noise were inherently highly variable among neighboring voxels, leading to the rejection of their parent subvolumes based on the resultant large values of the short axis length. Since areas of noise were thus efficiently rejected, establishing a higher threshold for rejection was unnecessary.

It has been shown that decreasing the subvolume size results in selection of a larger sample volume, but introduces more extrahepatic voxels into the final sample. This also comes at the cost of longer run time for the algorithm, which is an important consideration given that the goal of the algorithm is to improve workflow and therefore be efficient. In an example, 7-voxel subvolumes may be used. In this example, the erroneous volume at this size was not significantly different from that for larger subvolumes, while the total liver volume sampled was maximized. Use of the next smaller size of subvolume increased the amount of liver sampled, but nearly doubled the erroneous volume included in the sample and came at a significant cost in terms of run time (79.0 s vs. 33.9 s).

Example advantages of the selection technique described herein include, but are not limited to: full automation, rapid run time, and relative simplicity from a mathematical standpoint. The use of simple computations and non-reliance on existing atlases or population data may allow easy incorporation of this algorithm onto a conventional MR system console. Additionally, the rapid run times achieved on a suitable computer suggest that the algorithm can run quickly and unobtrusively on an MR system, which typically has fast processors and large amounts of memory available. The algorithm may be run in the background while other sequences in a liver MR protocol are acquired, alerting the MR technologist when it is finished without interrupting data acquisition.

In routine liver imaging with dual-echo technique, which is performed for visual imaging evaluation, this algorithm allows the scanner console to select a volume of liver for analysis for deposition disease. If deposition disease is suspected in that volume according to predefined criteria, the technologist can be alerted and a multi-echo or spectroscopic acquisition performed immediately; these techniques provide a more accurate quantitative assessment of the severity of disease than dual-echo imaging (2, 4, 6, 7, 9). This may allow for tailoring of an MRI examination to a patient's individual needs, reducing the need to perform spectroscopy or multi-echo acquisitions routinely, as well as obviating the need for the patient to return for a second examination for quantification of previously unsuspected disease.

In addition to detecting diffuse deposition disease at the time of imaging, this technique may then be used to guide ROI or spectroscopy voxel placement without requiring the presence of a physician. This may be performed by using a subvolume size similar to that of the desired spectroscopy voxel and performing spectroscopy in the accepted subvolume which provided the greatest signal to noise ratio (though this would require an additional calculation to determine the preferred subvolume). Alternatively, using a smaller subvolume size, a spectroscopy voxel may be placed automatically in the center of the final accepted volume. Due to the tendency of the algorithm to exclude the left hepatic lobe, however, this algorithm is not suitable for sampling multiple widely distributed portions of the hepatic parenchyma. Moreover, the characteristics of the subvolumes themselves may be helpful in characterizing diffuse hepatic parenchymal disease. Prior work has shown that information regarding the underlying hepatic metabolite deposition state can be gleaned from the ratio pair data, however, the fully quantitative validation of such a technique requires more detailed pathological information than that available in the study population.

The use of signal intensity ratios in this algorithm, which are normalized to values intrinsic to the particular MRI data set, rather than isolated signal intensity values with no normalization factors, suggests that the algorithm may be translated to data acquired with a 2D technique.

Misidentification of the fat-only and water-only data sets may be considered when using a two-point Dixon technique. This can confound quantitative and numerical analysis. The algorithm described herein may reliably detect and correct for the presence of complete fat/water swap, which may be used for analysis based on two-point Dixon data.

For the 7-voxel subvolumes, although the average proportion of the selected volume truly within the liver was very high (96.7%), in three cases, only 60-70% of the sample was actually located in the liver. There were cases of iron deposition further complicated by ascites, or where moderate motion artifacts were present in the examination. These data sets were included in an evaluation of the technique in order to obtain a more realistic prediction of test performance in clinical practice. However, there was a selection bias in this study, since all included subjects had a history of random core liver biopsy performed for known or suspected chronic liver disease, resulting in a greater proportion of disease than would be expected in the general population undergoing liver MRI.

Additionally, portions of the lateral segment of the left hepatic lobe were frequently excluded from the sample volume, due to the presence of greater motion artifacts and signal heterogeneity resulting from cardiac motion. Although diffuse deposition disease can involve the liver heterogeneously, it may be expected that the sample volumes obtained are large enough to be representative of liver disease overall. Finally, the portion of the algorithm selecting the blocks of subvolumes composing the final selection volume is relatively rudimentary, and may likely be improved with further experience.

Algorithms disclosed herein can provide fully automated, reliable selection of large volumes of hepatic parenchyma from dual echo MRI acquisitions for analysis for diffuse deposition disease. Further, algorithms disclosed herein can detect and correct for the presence of complete fat/water swap in the two-point Dixon image data sets. This may improve workflow in allowing automated analysis for deposition disease using established ranges of signal intensity ratios for normal and diseased liver. In the clinical implementation of MR spectroscopy of the liver, this technique may allow reliable, automated selection of an imaging volume prior to acquisition, removing the need to halt the examination until a radiologist is available to select the spectroscopic voxels. Further, algorithms disclosed herein can facilitate tailoring of an MRI examination to patient's individual needs and performance of multi-echo acquisitions or spectroscopy when such an extended protocol is needed.

In accordance with embodiments, short axis length may be calculated for ellipse representing an RP cloud by the method of FIG. 4. Initially, a cloud of RPs may be obtained (step 400). In this example, long and short axis lengths may be calculated for ratio pair clouds. The calculation may begin by deriving the center of the cloud (step 402) and a vector defining the direction of one of the axes in accordance with the following equations:

$$\text{Center} = (\text{cloud}_{IO}, \text{cloud}_{FW})$$

$$\text{Axisvector} = (\sigma_{cloudIO}, \sigma_{cloudFW})$$

where "cloud" is the set of RP values for the cluster, "axisvector" is a vector in RP space, "$\sigma_{cloudIO}$" is the standard deviation of the IO values of the RP, "$\sigma_{cloudFW}$" is the standard deviation of the FW values of the RP. At this point, it is unknown whether +axisvector or −axisvector actually defines one of the axes of the cloud, since the standard deviations calculated above yield positive values. The correct direction of the axisvector is defined by calculating the mean of the FW values for only the RPs for which IO>$\text{Center}_{IO}$. If that value is positive, the positive axisvector is retained, while if negative, the negative axisvector is used.

The method of FIG. 4 includes calculating an average distance from a center point to each RP along F/W and log(I/O) axes to generate a cloud with average distance vectors (step 404). A long axis vector may be determined for an ellipse from average distance vectors (step 406). Further, the method includes calculating a short axis vector perpendicular to the long axis (step 408). The method also includes calculating an average distance from the center point to each RP along the short axis vector (step 410). For example, the length of the axis of the cloud in the direction defined by axisvector can be calculated by the following:

$$axislength_1 = \left| \frac{axisvector_{IO}}{axisvector_{FW}} (\text{cloud}_{FW} - \text{Center}_{FW}) - (\text{Center}_{IO} - \text{cloud}_{IO}) \right|$$

$$axislength_2 = \left| \frac{axisvector_{FW}}{axisvector_{IO}} (\text{cloud}_{IO} - \text{Center}_{IO}) - (\text{Center}_{FW} - \text{cloud}_{FW}) \right|$$

$$axislength_{total} = \frac{(axislength_1) \cdot (axislength_2)}{\sqrt{axislength_1^2 + axislength_2^2}}$$

wherein $axislength_{total}$ is the distance between each RP in the cloud and a line defined by axisvector in the direction perpendicular to axisvector. This operation is repeated for a vector perpendicular to axisvector, so that two values for axislength result. The smaller is considered to represent the value of the short axis length.

In another study including retrospective and prospective portions, 130 consecutive abdominal MRI examinations were performed. The examinations included both an automated algorithm and reference standard fat/iron quantification. Algorithm performance was validated against the reference standard, and was compared with the performance of expert readers. Subsequently, 39 subjects undergoing liver MRI were prospectively identified and enrolled. These subjects were scanned with a protocol where quantification sequences were either performed or not performed based on the recommendation of the algorithm. Total examination time in these subjects was compared with examination times in the 90 subjects from the retrospective cohort who had undergone a similar liver MRI protocol with complete quantification.

In this study, the automated algorithm in accordance with embodiments of the present disclosure was accurate in determining the presence of deposition disease (93.1%), with no significant difference between its conclusions and those of any of the readers (p=0.48–1.0). Use of the algorithm resulted in a small but statistically significant time savings compared with performing quantification in all subjects (28:56 vs. 31:20, p<0.05). Based on these results, fully-automated screening for hepatic steatosis and siderosis can be performed real-time during abdominal MRI examinations, can save total scan time compared with always performing quantification, and can serve as a gatekeeper for large-scale screening efforts.

In a first part of the study, the 130 consecutive MRI examinations that were retrospectively identified included a 3D in- and opposed-phase T1w acquisition with a screening algorithm ("screening sequence"); a liver fat quantification sequence which generates liver fat fraction values as well as maps of the $R_2^*$ relaxation rate; and a second multi-echo/short echo spacing sequence for measurement of the $R_2^*$. This population was used to validate the accuracy of the screening algorithm and to compare its performance with that of expert readers. This group included 68 women and 62 men, age 55±16 years. MRI examinations were performed for a variety of indications including: metastatic disease (n=38), chronic liver disease (n=25), liver lesion (n=23), pancreatitis (n=12), abnormal liver function tests (n=7), abdominal pain (n=7), and other indications (n=11).

For the second part of the study, all MRI examinations performed for evaluation of the liver, with intravenous infusion of Gd-EOB-DTPA (Eovist/Primovist, available from Bayer Healthcare, of Wayne, N.J.) were selected from the above study population, yielding 90 examinations (52 women and 38 men, age 54±16 years). These were used to calculate average scan time for the "standardized" protocol, in which quantification was performed in all patients. Subsequently, 39 consecutive subjects undergoing identical liver MRI examinations with Gd-EOB-DTPA were prospectively enrolled (24 women and 15 men, age 54±14 years). In these patients, the MRI technologist was asked to follow the recommendation provided by the screening algorithm in order to determine whether quantification sequences were necessary. When advised that quantification was not necessary, the technologist skipped the quantification sequences and continued the remainder of the MRI examination. These cases were used to calculate scan times for the "personalized" protocol, in which quantification was only performed as recommended.

All imaging was performed on one of two identical 1.5 T clinical MRI systems. Imaging was performed using an anterior six-channel flexible array coil in combination with six elements of the table-mounted spine coil. The standard liver MRI protocol included the following pulse sequences: 3-planar localizer; coronal single-shot fast spin echo; axial 3D T1w with two-point Dixon reconstruction (serving as in/opposed phase sequence and fat suppressed precontrast-T1w); fat/iron quantification sequences; 3D T1w arterial phase; 3D T1w portal venous phase; thick slab MRCP; 3D T1w late dynamic phase; diffusion-weighed sequence; respiratory triggered T2w fast spin echo; 3D T1w hepatocyte phase; and coronal 3D T1w hepatocyte phase.

The screening sequence was acquired using a standard 3D in- and opposed-phase data acquisition with two-point Dixon reconstruction, followed by automated liver sampling yielding a large volume of interest (VOI) for analysis. In brief, the algorithm: calculates signal intensity ratios from in-phase/opposed-phase and fat-only/water-only data sets; selects a large VOI within the liver using an automated sampling algorithm; and draws a single conclusion for the liver (normal, fat, iron, combined disease) based on the predominant pattern of behavior of the signal intensity ratios calculated within the large VOI. The behavior both the signal intensity ratio analysis and the automated sampling algorithm has been shown to be robust in the presence of both liver fat and iron deposition. The final conclusion regarding the presence or absence of abnormal metabolites was recorded for each case.

Two quantification sequences were also performed. The fat quantification sequence acquired a total of six interleaved opposed- and in-phase data sets, then used a $T_2^*$-corrected calculation with six-peak spectral modeling. This provided both liver proton density fat fraction as well as maps of $R_2^*$ suitable for iron quantification. However, in some cases of severe iron deposition, the $R_2^*$ calculation is known to be affected by noise bias, so the additional multi-echo sequence based on a suitable technique may be acquired. The echoes used to perform the $R_2^*$ calculation were truncated according to a previously described method, in order to reduce the effect of noise bias (Bashir MR et al., 2012 ISMRM meeting). Although this method does not correct R2* for the presence of fat, it is necessary for cases of severe iron overload. Based on clinical experience, the $R_2^*$ value from the fat quantification sequence was used as the reference standard when that value was below 200 s$^{-1}$. For higher values, the $R_2^*$ value calculated from the second multi-echo sequence was used as the reference standard. Specific pulse parameters are given in Table 3 below, which sets forth pulse sequence parameters for the screening technique, fat quantification sequence, and multi-echo sequence $R_2^*$.

TABLE 3

|  | Screening Technique | Fat Quantification | Multi-Echo $R_2^*$ |
|---|---|---|---|
| Repetition Time (ms) | 7.5 | 200 | 200 |
| First Echo Time (ms) | 2.38 | 2.38 | 1.0 |
| Echo Spacing (ms) | 2.38 | 2.38 | 0.9 |
| Number of Echoes Acquired | 2 | 6 | 12 |
| Flip Angles (degrees) | 10 | 5 | 15 |
| Slice Thickness (mm) | 4 | 8 | 8 |
| Reconstruction Interval (mm) | 4 | 10 | 10 |
| Acquisition Matrix | 256 × 192 | 256 × 192 | 256 × 192 |
| Acceleration Factor | 2 | 2 | 2 |

Three blinded readers (abdominal imaging faculty with 12, 5, and 2 years of postfellowship experience) independently analyzed the image data sets yielded by the T1w 2-point Dixon acquisition. They were asked to each come to single conclusion regarding each examination, of normal, fat, iron, or combined disease. Readers were permitted to review all images from the in-phase, opposed-phase, fat-only, and water-only data sets, however, they were blinded to all other data.

For the reference standard, a single reader (abdominal imaging faculty with three years of post-fellowship experience) blinded to the results of the screening algorithm performed the measurements on the image data sets above. The reader placed three regions of interest (ROIs) in the liver (one each in the medial segment of the left lobe, and anterior and posterior segments of the right lobe), with each ROI not less than 2 cm² in area, avoiding areas of artifact and visible blood vessels. This was performed for both fat fraction and $R_2^*$ images, and the mean value of the ROIs was accepted as the reference standard value.

For purposes of the reference standard, an average proton density fat fraction of >5.6% was accepted as abnormal, indicating hepatic steatosis. The threshold for abnormal iron deposition is less well established, however a threshold of >70 s$^{-1}$ at 1.5 T was chosen to represent an abnormal value $R_2^*$ indicative of iron deposition.

The DICOM header data for each examination was used to calculate total scan time by subtracting the start time of the first pulse sequence in the examination from the sum of the start time of the final sequence and the duration of the final sequence. Examination times were calculated for each MRI performed using the standardized protocol (n=90) and each examination performed using the personalized protocol (n=39).

Descriptive characteristics were generated to summarize performance of the screening algorithm, each reader, and readers in aggregate for the detection of diffuse liver disease, compared with the reference standard. Algorithm performance was compared with performance of each reader using McNemar's test, and Cohen's weighted κ test was used to assess agreement between the results of the algorithm and the determinations of the readers.

For the time analysis, mean and standard deviation of scan time was calculated from the individual scan times for examinations performed using the standardized and personalized protocols. Average scan times compared using the student's t-test.

Figure 7:
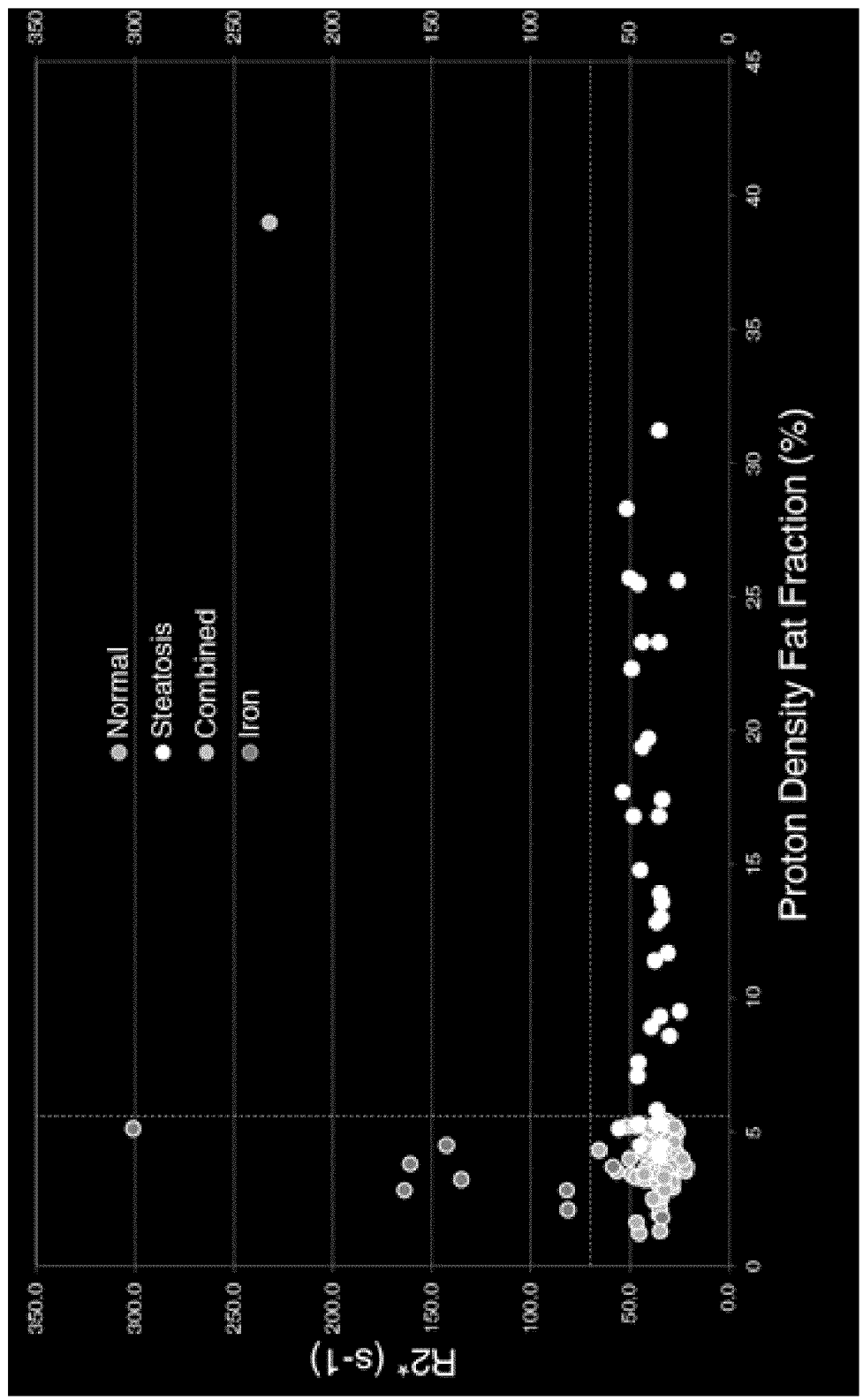
FIG. 7 is a graph showing a summary of results of quantification sequences in the first portion of the study.

In the larger study population (n=130), the prevalence of disease was 28% (28 patients with steatosis, 7 with iron deposition, 1 with combined disease). The distribution of values for fat fraction and $R_2^*$ are summarized in FIG. 7, which illustrates a graph showing a summary of results of quantification sequences in the first portion of the study. Referring to FIG. 7, each part of the graph is coded to represent the presence and type of disease according to the reference standard. Each dot on the graph represents a study subject, with the dot color-coded to reflect the conclusion reached by the automated algorithm. All subjects with disease are characterized. Measured fat fraction values ranged from 1.2-39.0%, and $R_2^*$ values ranged from 22.1-301 s$^{-1}$.

The performance of the screening algorithm is summarized and compared with reader performance in Table 4 below. The table provides a comparison of reader and screening algorithm performance for detection of diffuse liver disease (reader post-fellowship experience: reader 1-2 years, reader 2-5 years, reader 3-12 years).

TABLE 4

|  | Reader 1 | Reader 2 | Reader 3 | Reader Average | Screening Algorithm |
|---|---|---|---|---|---|
| Sensitivity | 94.4% (34/36) | 97.2% (35/36) | 97.2% (35/36) | 96.3% (34.7/36) | 100% (36/36) |
| Specificity | 90.4% (85/94) | 87.2% (82/94) | 90.4% (85/94) | 89.4% (84/94) | 90.4 (85/94) |
| Positive Predictive Value | 75.6% (34/45) | 74.5% (35/47) | 79.5% (35/44) | 99.2% (83/83.7) | 100% (85/85) |
| Negative Predictive Value | 100% (85/85) | 98.8% (82/83) | 98.8% (82/83) | 99.2% (83/83.7) | 100% (85/85) |
| Accuracy | 91.5% (119/130) | 90.0% (117/130) | 92.3% (120/130) | 91.3% (118.7/130) | 93.1% (121/130) |

Both the screening algorithm and the readers were highly accurate in determining the presence of deposition disease (93.1% vs. 91.3%). McNemer's test demonstrated no difference in performance between the algorithm and any of the three readers (p=0.48–1.0). Agreement between the algorithm's result and the determinations of each of the three readers was excellent (κ=0.86–0.88, lowest 95% confidence interval=0.77–0.96).

The algorithm achieved a 100% negative predictive value in this study, meaning it can reliably exclude the presence of deposition disease. The algorithm's positive predictive value was also high at 80%: only 20% of the cases concluded by the algorithm to represent disease were subsequently determined to be normal, according to the reference standard quantification sequences.

Figure 8:
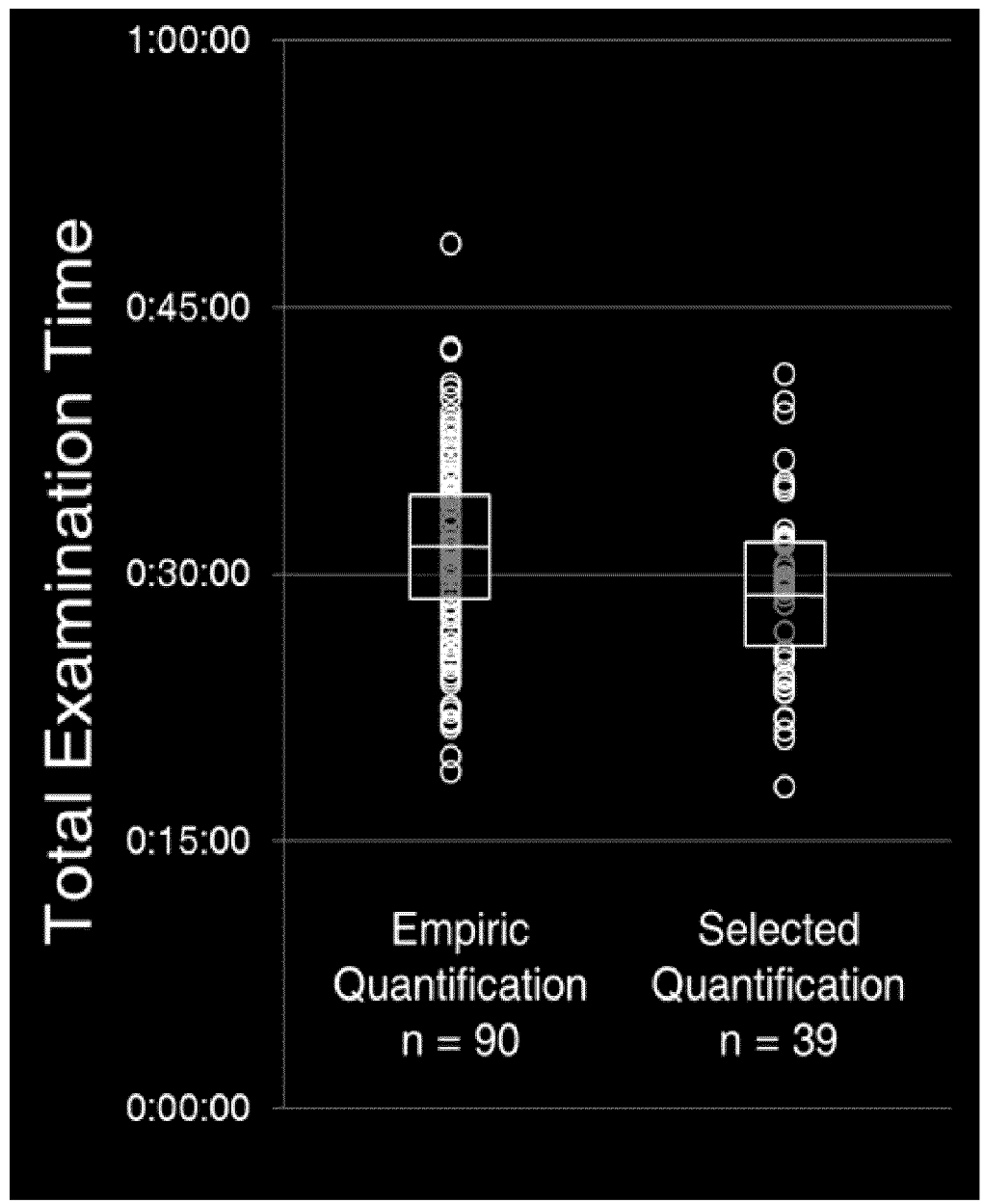
FIG. 8 is a graph showing a comparison of MRI examination times in subjects undergoing MRI with complete quantification and selected quantification according to the recommendation algorithm.

The result so the time comparison are shown in FIG. 8, which illustrates a graph showing a comparison of MRI examination times in subjects undergoing MRI with complete quantification and selected quantification according to the recommendation algorithm. There was a significant reduction in examination time when using the algorithm (28:56 vs. 31:20, p<0.05). The average examination time when using the standardized protocol was 31:20±5:50, while the average examination time for the personalized protocol was 28:56±5:29. Use of the personalized protocol with the screening algorithm yielded a small but statistically significant time savings of 2:24 (p<0.05).

Figure 9:
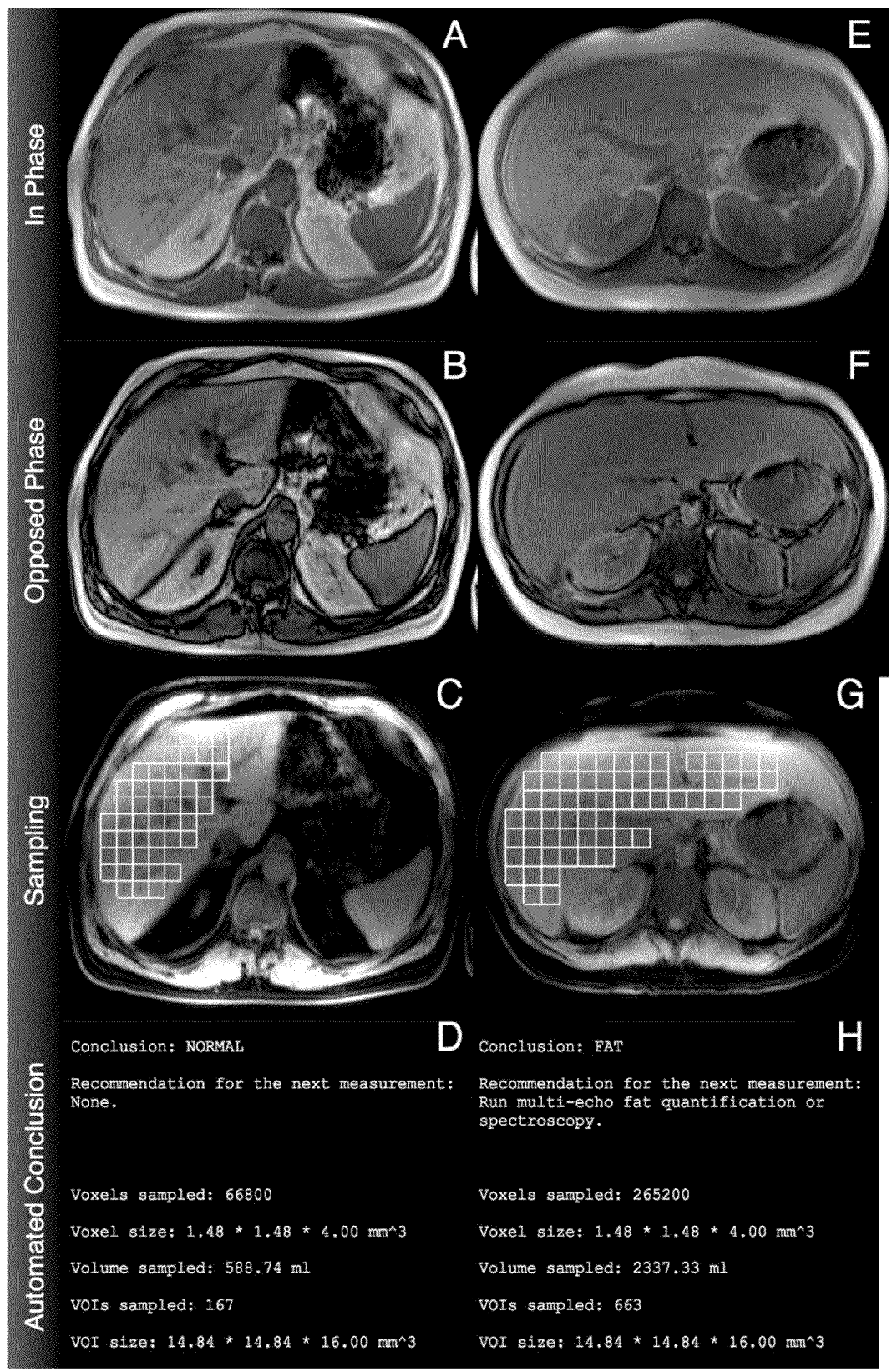
FIG. 9 shows representative images of the performance of a screening algorithm in accordance with embodiments of the present disclosure.

Two representative examples are shown in FIG. 9, displaying representative images from the source in- and opposed-phase data sets, the liver sampling algorithm, and the automated conclusion with recommendation for quantification. Particularly, FIG. 9 illustrates two representative examples of the performance of the screening algorithm. FIGS. 9A-9D are from a 62-year old man with no liver deposition disorder, and FIGS. 9E-9H are from a 33-year old woman with hepatic steatosis. In-phase (FIGS. 9A, 9E) and opposed-phase (FIGS. 9B, 9F) images can be used to visually confirm the presence or absence of disease. The "sampling" images (FIGS. 9C, 9G) show the results of the sampling portion of the algorithm and are used to confirm representative sampling of the liver. The "automated conclusion" images (FIGS. 9D, 9H) are shown to the technologist performing the study during the examination and are used to guide tailoring of the MRI protocol.

Non-alcoholic fatty liver disease (NAFLD) is an important public health concern, particularly in the United States, where up to 80 million people may be affected. Non-alcoholic fatty liver, even in the absence of clinical symptoms or liver function test abnormalities, is risk factor for development of the metabolic syndrome, with its attendant risks of cardiac disease and diabetes. Though patients with hepatic steatosis can be asymptotic for years, a subset can progress to non-alcoholic steatohepatitis (NASH), a chronic necroinflammatory state which is characterized by diffuse liver damage and, ultimately, irreversible fibrosis. In addition, NAFLD with only mild liver function test abnormalities has been shown to be a strong independent risk factor for cardiac death. Iron overload is a somewhat less common cause of liver disease, but can complicate NAFL or exist as a separate disease entity, particularly in patients receiving chronic transfusions. In fact, the development of iron overload in the background of NAFL can confound fat quantification and may have implications for the course of disease in viral hepatitis C, so liver fat and iron must be assessed simultaneously.

This study shows that an automated algorithm can detect hepatic steatosis, as well as iron overload, using only a standard MRI pulse sequence acquired for routine diagnostic purposes and requiring without user interaction. The algorithm can then offer recommendations for protocol modification during the examination, allowing for an efficient, patient-tailored MRI to be performed. Although the positive predictive value of 80.0% indicates that use of the algorithm may result in some false positive results, no patients with proven fat or iron deposition were misdiagnosed as unaffected. This high negative predictive value allows fat and iron quantification sequences to be performed only when needed, providing efficient workflows, which are becoming more necessary with increasing scrutiny over the high cost and possible overuse of MRI and medical imaging overall.

Given the prevalence and potential morbidity of these diseases, particularly NAFLD, some sort of population screening algorithm program may be cost-effective; screening programs have shown substantial reductions in the impact of other disease, such as breast, cervical, and colon cancer. While the relatively high cost of MRI may prohibit screening in the asymptomatic population, incidental screening, and quantification when needed, can be performed during routine abdominal MRI performed for other indications. This would capture at least a subset of the population, and may improve our understanding of the prevalence, risk factors, and natural history of NAFLD/NASH. As opposed to performing MRI examinations for the sole purpose of screening, the additive cost of such an "incidental screening" program may be quite small.

Self-adapting imaging protocols may become increasingly important in the modern practice of MRI. Traditionally, supervising physicians can be available at the time of examination to make decisions regarding protocol alterations. However, with the decentralization of imaging hardware to numerous, often remote sites in modern radiology practices, personal attention to each MRI acquisition on the part of a physician is no longer realistic. Nonetheless, the broad variety of pulse sequences available for each examination necessitates logical decision-making algorithms in order to tailor scan protocols to the needs of individual patients. The automated screening algorithm used in this study is an example of such a method for personalizing examination protocols.

The presently disclosed subject matter can provide fully-automated, user-independent screening for hepatic steatosis and siderosis can be performed real-time during abdominal MRI examinations, and can direct MRI protocol optimization to the needs of the individual patient. Such a paradigm can save total scan time compared with performing quantification sequences in all patients, and can serve as a gatekeeper for large-scale screening efforts.

Figure 10:
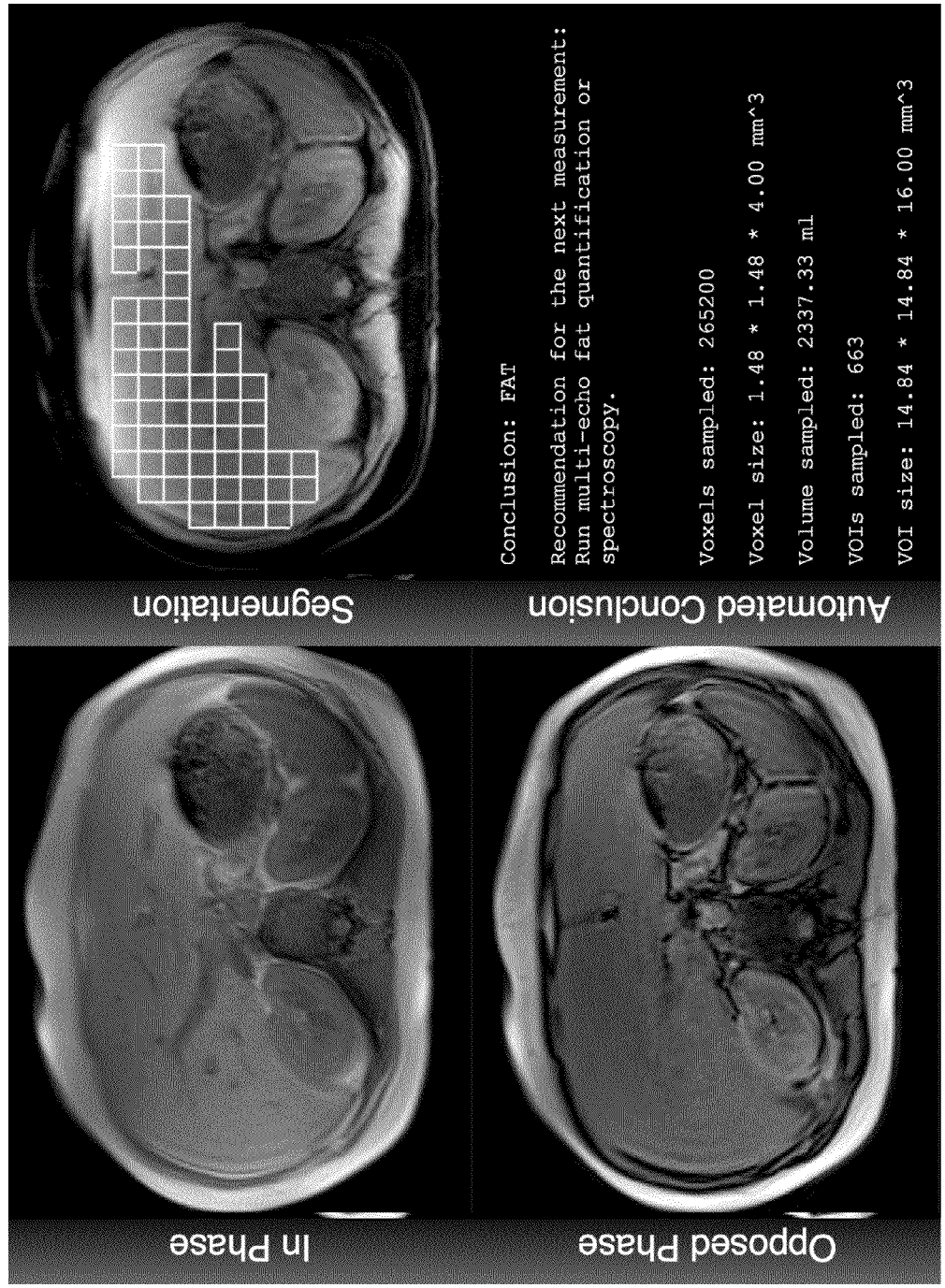
FIG. 10 is an example screen display showing an in-phase image, an opposed-phase image, a segmentation image, and text of an automated diagnosis conclusion of a liver in accordance with embodiments of the present disclosure.

FIG. 10 illustrates an example screen display showing an in-phase image, an opposed-phase image, a segmentation image, and text of an automated diagnosis conclusion of a liver in accordance with embodiments of the present disclosure. Referring to FIG. 10, the conclusion is that the liver is in a normal condition and that there is no recommendation for the next measurement. The text also indicates a number of voxels sampled, the voxel size, the volume sampled, the VOIs sampled, and the VOI size.

Figure 11:
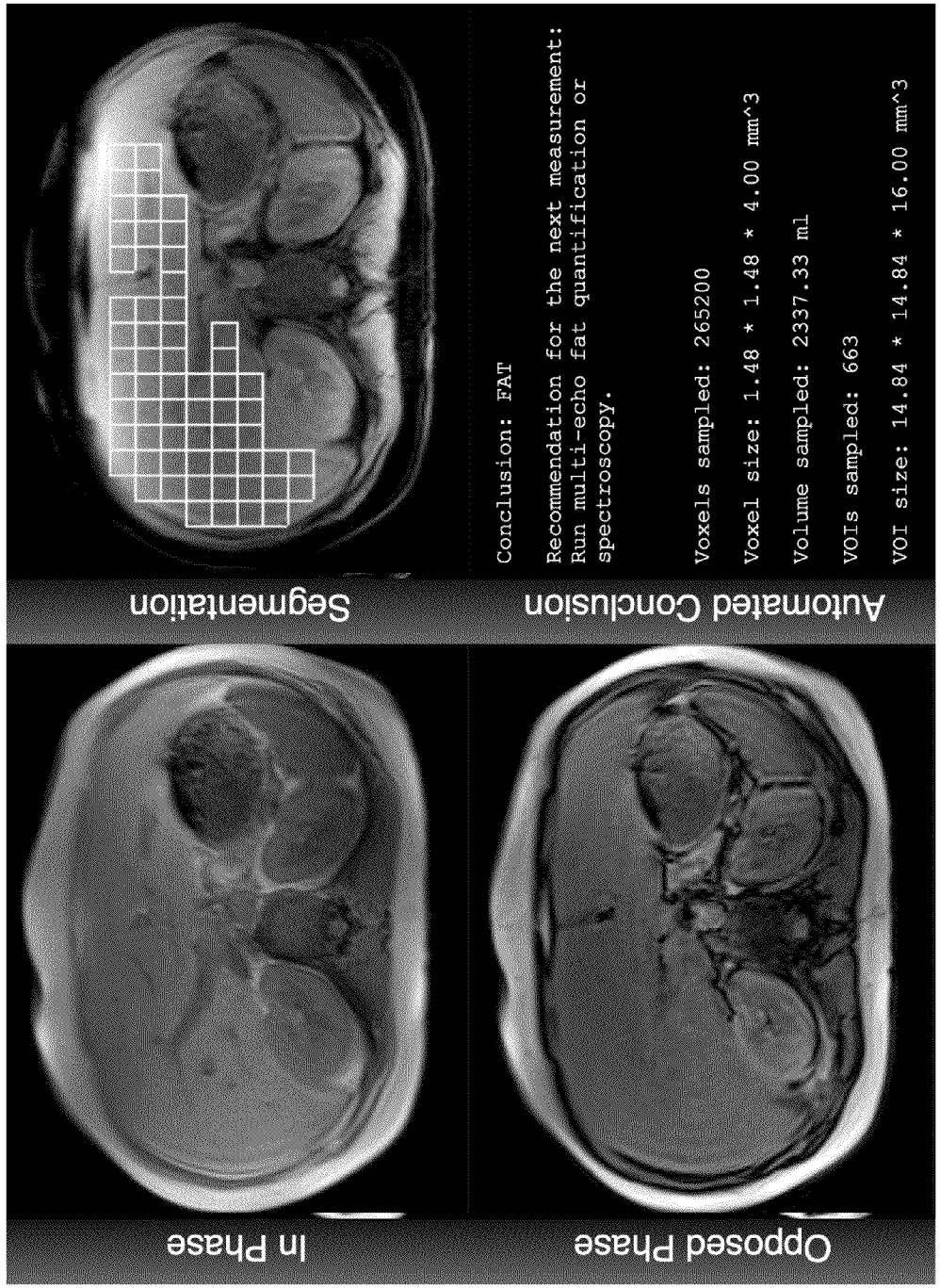
FIG. 11 is another example screen display showing an in-phase image, an opposed-phase image, a segmentation image, and text of an automated diagnosis conclusion of a liver in accordance with embodiments of the present disclosure.

FIG. 11 illustrates another example screen display showing an in-phase image, an opposed-phase image, a segmentation image, and text of an automated diagnosis conclusion of a liver in accordance with embodiments of the present disclosure. Referring to FIG. 11, the conclusion is that the liver is in a fat condition and that a multi-echo fat quantification or spectroscopy should be run for the next measurement. The text also indicates a number of voxels sampled, the voxel size, the volume sampled, the VOIs sampled, and the VOI size.

In yet another study, all patients who were referred for an abdominal MR examination for evaluation of suspected diffuse parenchymal liver disease and who, in addition, underwent random core liver biopsy within a 2-month window of their MR exam, were included in this study. The study population of 71 patients included 39 female patients and 32 male patients averaging 48.4±13.7 years ranging from 19 to 78 years of age.

All liver tissue samples consisted of at least one 18-gauge random core from the central right hepatic lobe and were deemed adequate for interpretation by the hepatopathologist at a tertiary care center. Grading of hepatic steatosis was based on a standard evaluation employed in hepatopathology using hematoxylin and eosin staining on a visual scale from 0 to 4: grades 0-1 corresponded to no or less than 5% visible fat at 250× magnification, respectively; grades 2-4, corresponding to equal to or greater than 5% fatty infiltration at 250× magnification, representing "substantial fat deposition". Since the presence of hepatic steatosis of grades 0-1 is considered within physiologic limits in the pathology literature, only grades 2-4 were considered positive for the presence of fatty liver disease in the study. A differentiation into different degrees of fatty liver disease severity were not implemented in the study.

Iron deposition was graded based on a standardized evaluation employed in hepatopathology using Prussian blue staining on a standard 0-4 visual scale: grades 0-1 corresponded to no visible iron granules at 400× magnification and iron granules barely discernible at 250× magnification but confirmed at 400× magnification, respectively; grades 2-4 corresponded to discrete granules resolved at 100× magnification or less. The presence of hepatic iron of grades 0-1 is generally considered to be physiologic in the pathology literature, therefore only grades 2-4 (>40 micromoles/g liver tissue) were considered positive for the presence of hepatic iron deposition in the study. A differentiation into different degrees of iron storage disease severity were no implemented in this study.

Combined fat and iron deposition was considered present in biopsy samples demonstrating both substantial fat (grades 2-4) and substantial iron (grades 2-4) deposition; analogously, a differentiation into different degrees of combined disease severity were not implemented in the study. A biopsy was considered "normal" if neither deposition process was present (grades 0-1). Patients with histopathologic findings of hepatic cirrhosis, confluent fibrosis or hepatic inflammation were excluded.

The study involved Dixon MR imaging and parameter sampling. Particularly, all 71 abdominal MRK examinations were performed on either 1.5 Tesla (T), n=57, or 3 T, n=14 MR systems equipped with high performance gradients using a six-channel torso phased-array coil in combination with the table-mounted spine matrix coil The imaging protocol included a three-dimensional parallel-accelerated in- and opposed-phase volumetric interpolated breath-hold examination (VIBE) sequence using the following parameters: at 1.5 T, repetition time (TR) 7.48 ms, echo times (TE)$_{opposed-phase}$ 2.38 ms, TE$_{in-phase}$ 4.76 ms, flip angle 10°, readout echo bandwidth 290 Hertz (Hz)/pixel, matrix 256×192; at 3 T, TR was 3.91 ms, TE$_{opposed-phase}$ 1.225 ms, TE$_{in-phase}$ 2.45 ms, flip angle 7°, readout echo bandwidth 850 Hz/pixel, matrix 256× 256. At both field strengths, the number of signal averages was one, and slice thickness was 3 mm.

The combination of volumetric acquisition schemes with parallel acceleration allows the implementation of three-dimensional T1-weighted gradient-echo breath-hold in- and opposed-phase MR sequences with two-point Dixon post processing. The echo spacing results in two imaging series, one with water and lipid signals in phase coherence, and another with water and lipid signals with an opposing phase configuration. Subsequent summation and subtraction of in-phase and opposed-phase datasets enables generation of fat-only and water-only image datasets. Three-dimensional T1-weighted gradient-echo sequences such as VIBE obtain a near-simultaneous acquisition of in- and opposed-phase MR series, to allow calculation of artifact-suppressed fat-only and water-only MR series. These yield various characterizing signal intensity parameters for each voxel of the three-dimensional dual-echo MR acquisition scheme, in particular the acquired opposed-phase and in-phase echoes as well as calculated water-only and fat-only data series.

Parameter assessment was performed on a dedicated post-processing workstation. Hepatic regions-of-interest (ROIs) were defined on a T1-weighted in-phase image series and mirrored onto the opposed phase, fat-vector and water-vector image series. ROIs were chose to be ~3.0 cm$^2$ in size, avoiding visible blood vessels, focal hepatic lesions and artifacts. On each series, ROIs were selected in the anterior right hepatic segment at the level of the porta hepatis as well as in the posterior right hepatic segment cranial and caudal to the right portal vein, and the mean values of the three ROIs were averaged for each series. The ratios of signal intensity on in-phase to opposed-phase series, "I/O ratio", as well as fat-vector to water-vector series, "F/W ratio", were calculated for each ROI quartet. ROI placement and ratio calculations were performed by a signal abdominal imaging fellow.

The single-ratio metabolite discrimination technique was based on analysis of I/O ratios alone. Linear optimization, a mathematical technique to achieve the best possible outcome—in this study "diagnostic fidelity"—in a given environment—in this study "biopsy-proven deposition syndrome"—was employed to identify distinct I/O ratio thresholds. Ultimately, this resulted in a trisection of the one-dimensional I/O ratio scatter plot with thresholds that allowed the differentiation between iron deposition vs. non-iron deposition as well as steatosis hepatis vs. non-steatosis hepatis.

The dual-ratio technique was based on analysis of both I/O as well as F/W ratios using a two-dimensional scatter plot for all ratio pairs. Initially, linear optimization was used to determine an F/W ratio threshold which allowed differentiation between physiologic hepatic parenchyma and presence of any hepatic storage disease entity. Then, logarithmic regressions were performed separately for steatosis hepatis and iron deposition clusters, to approximate the relationship between corresponding F/W and I/O ratios. Finally, linear optimization was applied between iron deposition vs. non-iron deposition as well as steatosis vs. non-steatosis hepatis. The presence of combined disease was confirmed when hepatic storage disease was detected by F/W ratio, however, the discriminator functions yielded non-isoloated iron deposition and non-isolated steatosis hapatis I/O ratios. Eventually, four sectors in the two-dimensional scatter plot were identified containing I/O and F/W ratio pairs characteristic for normal hepatic parenchyma, iron deposition, steatosis hepatis and combined disease.

The computer-aided dual-ratio technique analogously was based on analysis of I/O as well as F/W ratios. An automated computer algorithm calculated both ratios for each voxel throughout the entire dataset for each patient, utilizing a 2.4 GHz 64-bit dual-processor 6 GB RAM system employing the MATLAB® environment. Disease-dependent false-color images were generated according to the previously defined thresholds and discriminator functions. After predefined seed-point definitions in the expected location of the right hepatic lobe, the Canny edge-detection routine included in the MATLAB® programming environment was used to create an edge map from the in-phase data set. VOIs were generated around each seed point and confined by the edge map; intrahepatic VOI placement was manually confirmed. The I/O and F/W ratios within these VOIs were assessed using the previously determined threshold and discriminator functions to calculate the probability of the presence of each type of deposition disease: if >70% of the F/W ratios within the VOI were below the normal threshold, the algorithm predicted normal hepatic parenchyma. Alternatively, if >70% of the F/W ratios were above the normal threshold, a conclusion of presence of hepatic storage disease entity was drawn. Subsequently, if >70% of the ratio pairs fell into the region defined by either discriminator functions, steatosis hepatic or hepatic iron deposition was predicted. If the latter condition was not satisfied, a combination of both hepatic storage states was predicted. The ratio distribution, number of voxels per VOI, and algorithm processing time to analyze the entire three-dimensional dataset were recorded.

Statistical assessment was performed employing univariate general linear model (GLM) analyses by comparing the intensity ratios characteristic for normal hepatic parenchymas, iron deposition, steatosis and the combined deposition state for the single-ratio metabolite discrimination and dual-ratio metabolite discrimination techniques. To assess significance of disease-specific ratio ranges, I/O and F/W ratios were defined as dependent parameters, biopsy results were defined as fixed factors; the influencing factor "magnetic field strength" was defined as covariate. A balanced, full factorial model was chosen; Bonferroni post hoc analyses were performed for the dependent variables. Sensitivity, specificity and accuracy of the analyzed metabolite discrimination techniques were subsequently determined. All graphical linear optimization, regression and GLM analyses were performed utilizing the SPSS software version 13.0. A p level of <0.05 was considered to be statistically significant.

Liver biopsies were performed within 17.7±17.0 days of the abdominal MR examination. The 71 hepatic core biopsies showed: 16 patients with substantial hepatic steatosis (grade 2: 4 patients; grade 3: 3 patients; grade 4: 9 patients); 11 patients with increased hepatic iron deposition (grade 2: 1 patient; grade 3: 5 patients; grade 4: 5 patients); in 3 patients the presence of both steatosis and increased iron deposition was confirmed (all patients grade 4 for iron and fat). Forty-one hepatic core biopsies did not reveal any evidence of either significant steatosis or increased hepatic iron deposition and were considered normal.

Figure 12:
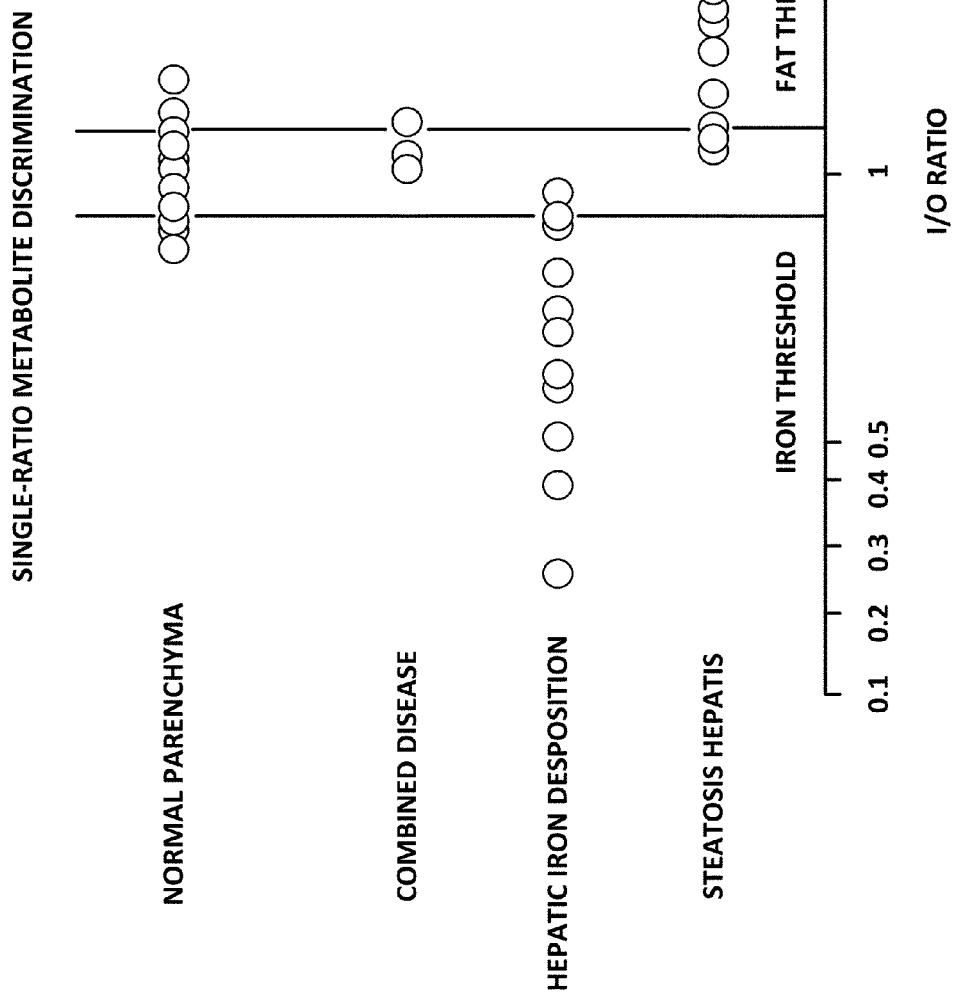
FIG. 12 shows a one-dimensional scatter plot of a single-ratio metabolite discrimination technique.

Linear optimization identified an I/O ratio threshold of <0.88 which permitted distinction between iron deposition vs. non-iron deposition, p<0.001, hereafter termed "iron threshold" (I/O$_{Iron\ threshold}$<0.88). Differentiation between steatosis hepatis vs. non-steatosis was achieved for I/O ratios>1.15, p=0.021, hereafter termed "fat threshold" (I/O$_{Fat\ threshold}$>1.15). I/O ratios of >0.88 as well as <1.15 corresponded to either combined disease or normal hepatic parenchyma. I/O ratios for normal parenchyma and combined disease did not differ significantly, p=0.88, which is illustrated by the graph shown in FIG. 12. Magnetic field strength as covariate did not show statistical significant impact, p=0.81. Referring to FIG. 12, the graph shows a one-dimensional scatter plot of the single-ratio metabolite discrimination technique.

Applying these thresholds, the single-ratio metabolite discrimination technique achieved test characteristics differentiating normal hepatic parenchyma, shown in FIG. 13, from hepatic iron deposition, shown in FIG. 14, and from steatosis hepatis, shown in FIG. 15, outlined in Table 5 shown below.

TABLE 5

| | Single-Ratio Technique | | |
|---|---|---|---|
| | Steatosis (%) | Iron (%) | Abnormal (%) |
| Sensitivity | 75.0 | 81.8 | 70.0 |
| Specificity | 96.4 | 96.7 | 92.7 |
| Accuracy | 91.5 | 94.4 | 83.1 |

Figure 13:
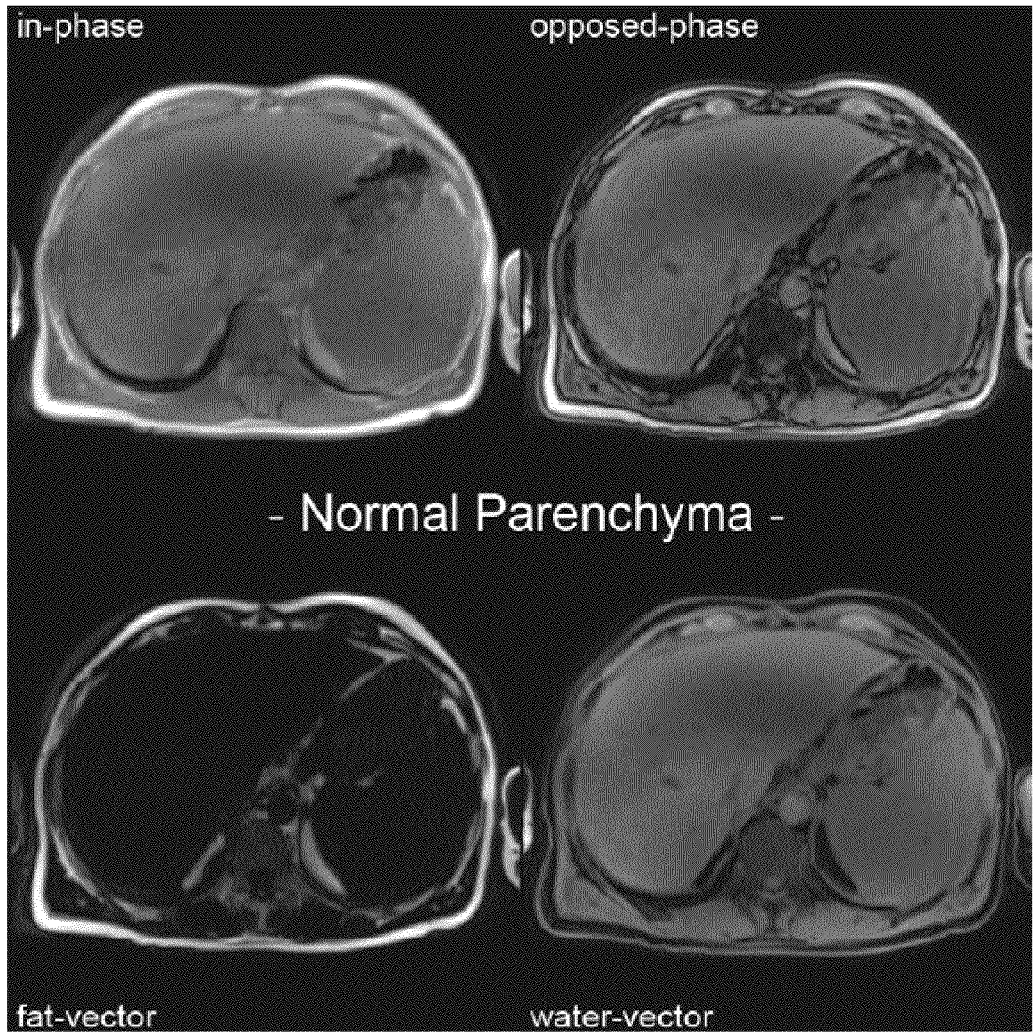
FIG. 13 shows MRI images of a 34-year old male without hepatic storage disease confirmed on histopathologic analysis and normal 2 pt Dixon hepatic MR imaging consisting of acquired in- and opposed-phase series and calculated fat- and water-vector series.

FIG. 13 shows MRI images of a 34-year old male without hepatic storage disease confirmed on histopathologic analysis and normal 2 pt Dixon hepatic MR imaging consisting of acquired in- and opposed-phase series and calculated fat- and water-vector series.

Figure 14:
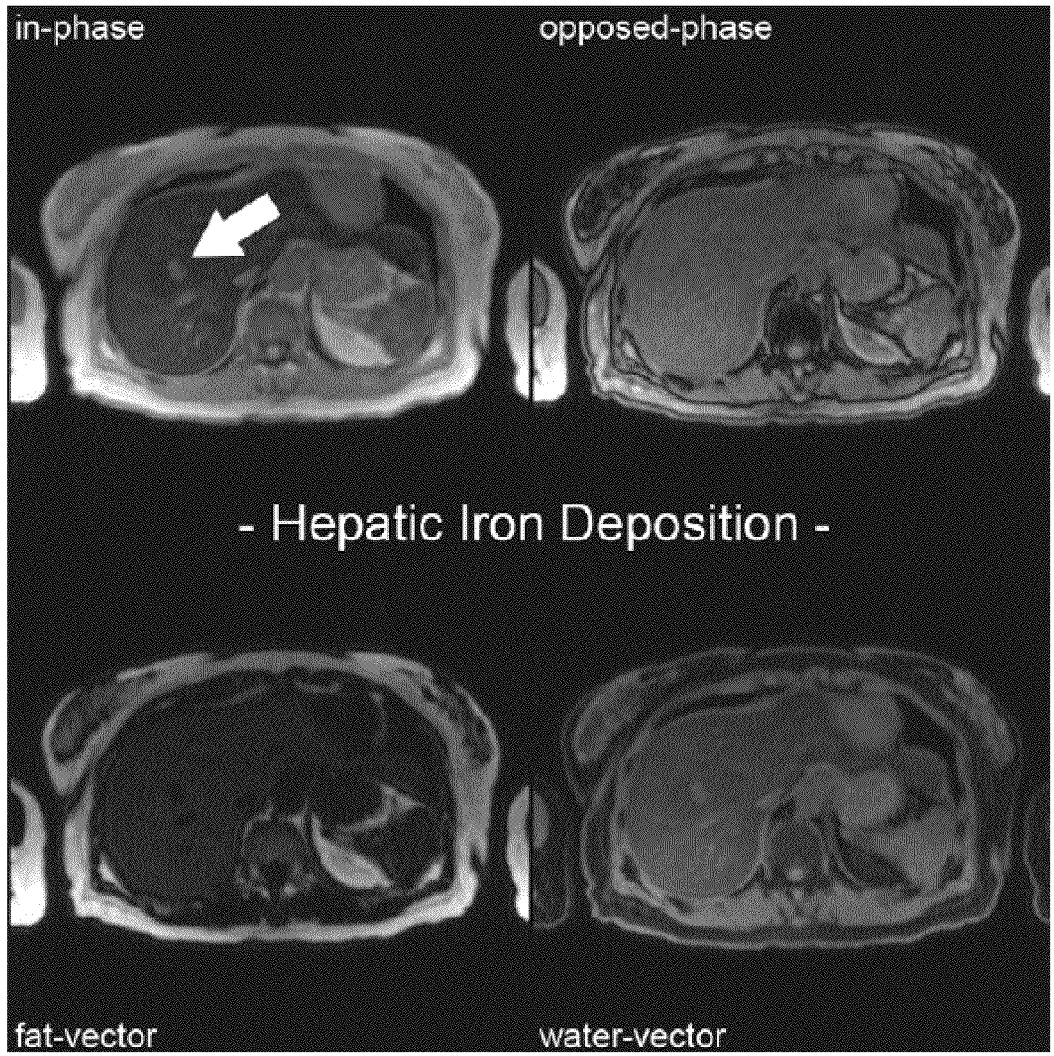
FIG. 14 shows MRI images from a 54-year old female with hepatic iron deposition confirmed on histopathologic analysis.

FIG. 14 shows MRI images from a 54-year old female with hepatic iron deposition confirmed on histopathologic analysis. The later acquired in-phase series (TE 2.2 ms) shows a substantial signal loss compared to the earlier acquired opposed-phase series (TE 1.2 ms); false-positively increased hepatic signal intensities on fat-vector series. The arrow indicates a non-iron containing hemangioma.

Figure 15:
FIG. 15 shows MRI images from a 51-year old female with hepatic steatosis confirmed on histopathologic analysis.

FIG. 15 shows MRI images from a 51-year old female with hepatic steatosis confirmed on histopathologic analysis. The opposed-phase series shows a substantial signal loss compared to the in-phase series, and increased hepatic signal intensities on fat-factor series are seen. The arrow indicates a non-fat containing hemangioma.

Figure 16:
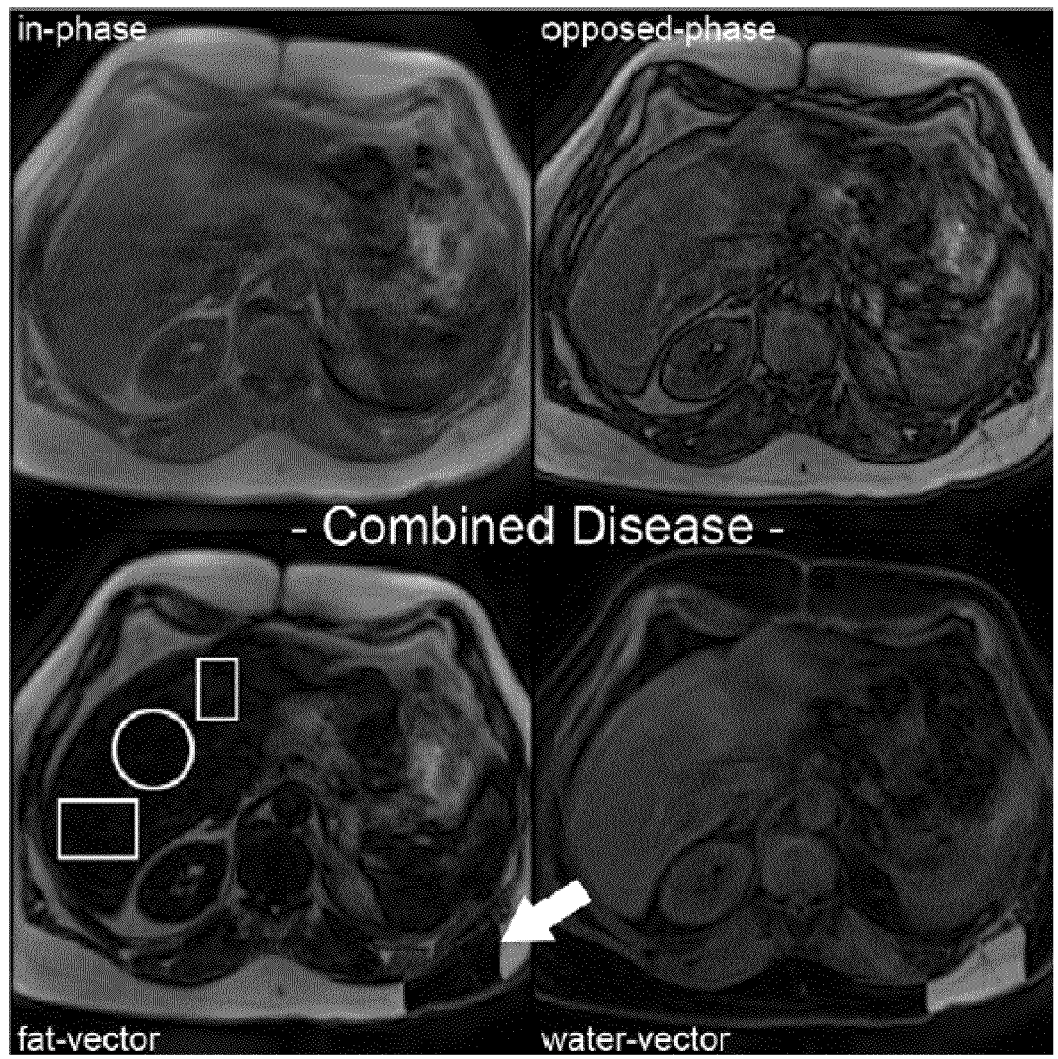
FIG. 16 shows MRI images from a 44-year old male with combined hepatic iron deposition and steatosis confirmed on histopathologic analysis.

FIG. 16 shows MRI images from a 44-year old male with combined hepatic iron deposition and steatosis confirmed on histopathologic analysis. The in- and opposed-phase series show heterogenous hepatic parenchyma. Regionally increased hepatic signal intensities on fat-vector series (indicated by boxes) result either from false-positive detection of iron deposition or true-positive representation of steatosis. Heterogenous areas of signal loss on fat-vector series (indicates by the circle) result either from cancellation effects arising from simultaneous occurring susceptibility and chemical shift phenomena on the acquired in- and opposed-phase series or correspond with detection of normal parenchyma. The arrow indicates a fat/water swap artifact.

Figure 17:
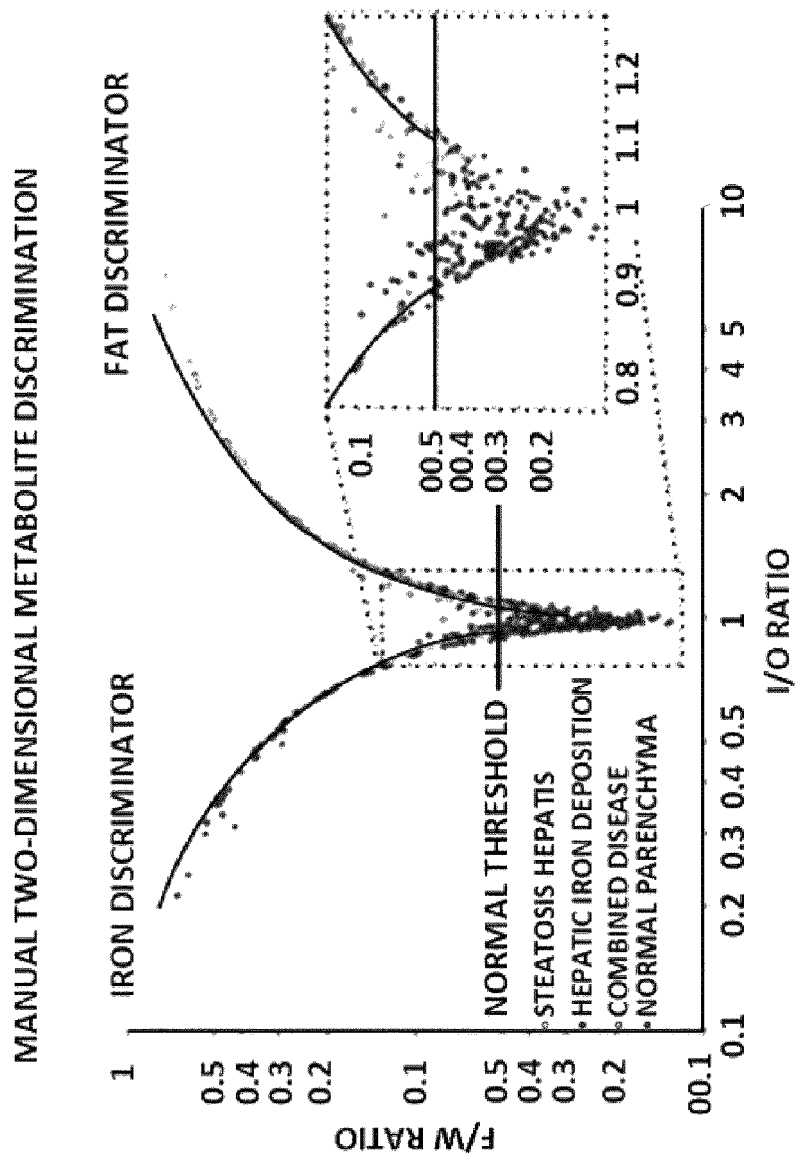
FIG. 17 is a two-dimensional scatter plot of the ROI-based dual-ratio metabolite discrimination technique.

Linear optimization successfully identified an F/W ratio threshold of ≤0.05 which allowed differentiation of normal hepatic parenchyma from abnormal hepatic parenchyma, p<0.001, hereafter termed "normal threshold" (F/W$_{Normal\ threshold}$≤0.05), which is illustrated in FIG. 17. FIG. 17 illustrates a two-dimensional scatter plot of the ROI-based dual-ratio metabolite discrimination technique. A logarithmic threshold function allowed differentiation between iron deposition vs. non-iron deposition (iron discriminator) and steatosis hepatis vs. non-steatosis hepatis (fat discriminator). The discriminator for detection of intrahepatic fat deposition was derived using logarithmic regression ($R^2$=0.994 and p<0.001) yielding the function I/O$_{Iron\ discriminator}$<e$^{(F/W_{Fat} - 0.01)/0.48}$ for F/W$_{Normal\ threshold}$>0.05, hereafter termed "iron discriminator". Assessment of I/O ratios showed statistically significant differences between steatosis hepatis, hepatic iron deposition as well as combined disease when the corresponding F/W ratio was greater than 0.05, p<0.001. Magnetic field strength as covariate did not show statistical significant impact, p=0.79.

Figure 18:
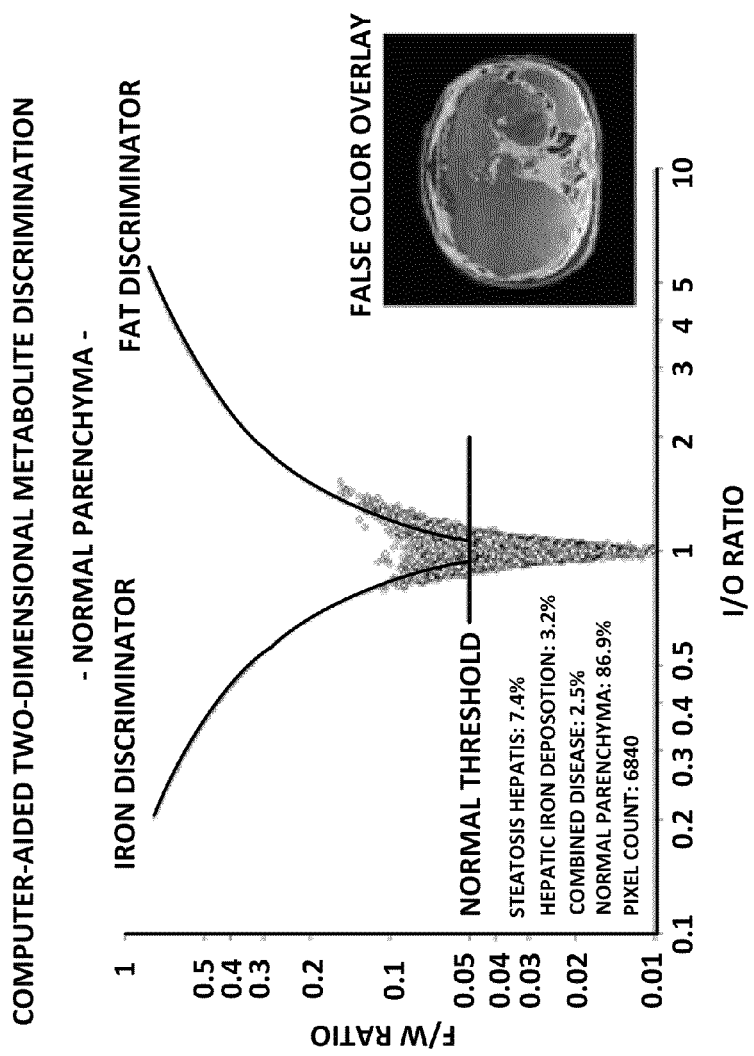
FIG. 18 is a two-dimensional scatter plot of the computer-aided dual-ratio metabolite discrimination technique identifying histologically confirmed normal hepatic parenchyma.
Figure 19:
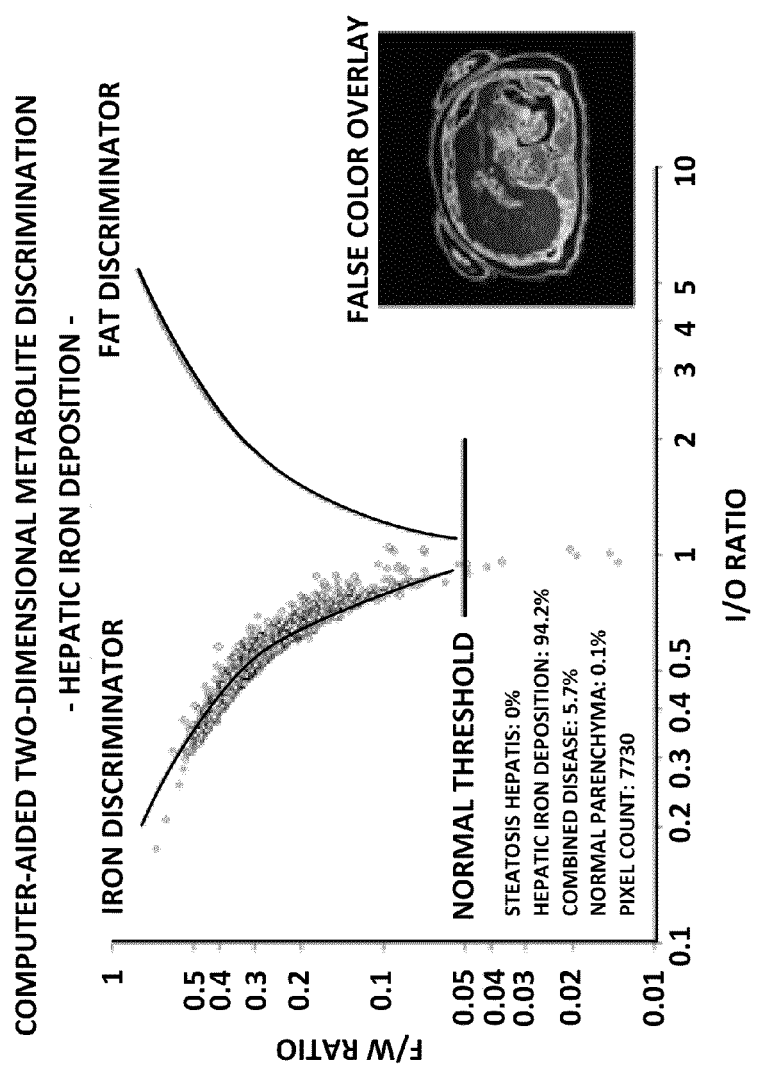
FIG. 19 is a two-dimensional scatter plot of the computer-aided dual-ratio metabolite discrimination technique identifying histologically confirmed hepatic iron deposition.
Figure 20:
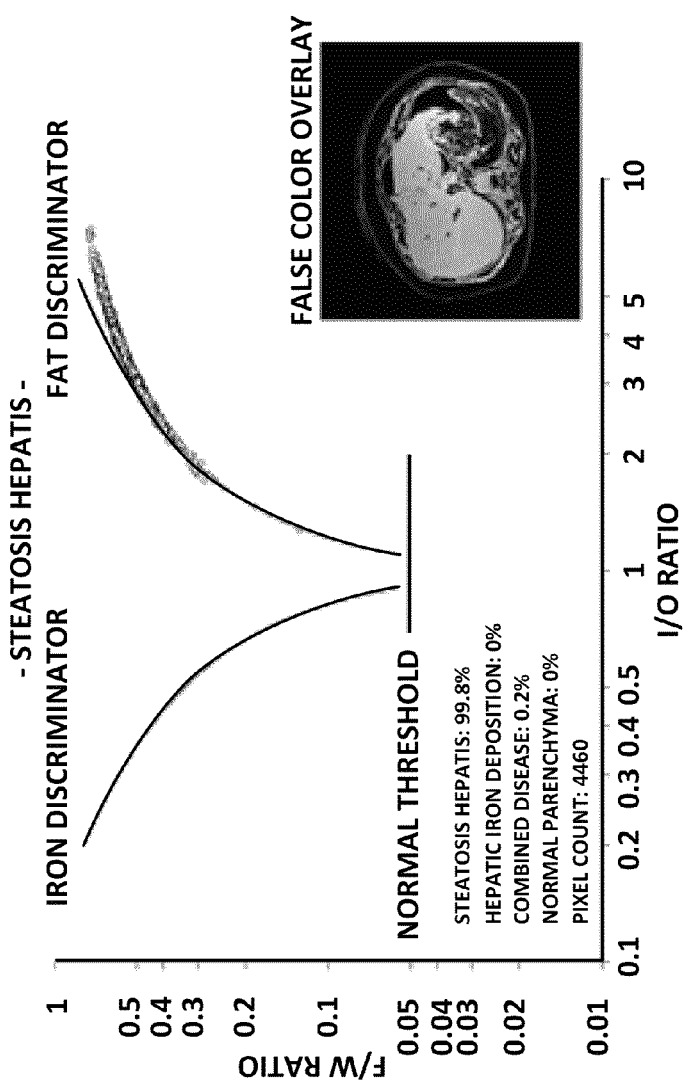
FIG. 20 is a two-dimensional scatter plot of the computer-aided dual-ratio metabolite discrimination technique identifying histologically confirmed steatosis hepatis.
Figure 21:
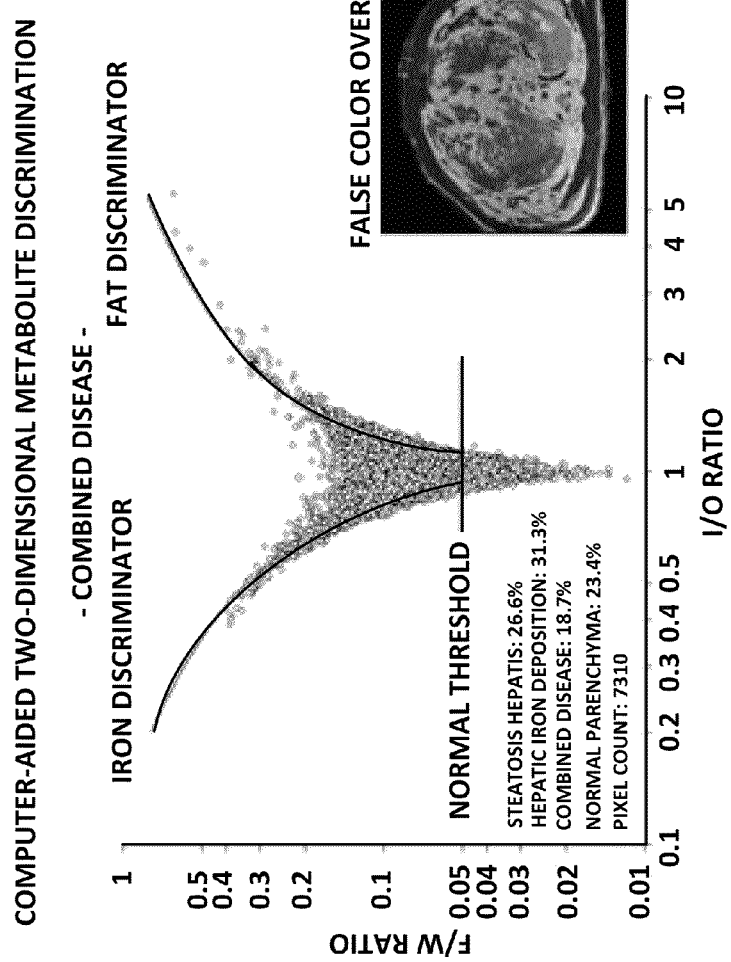
FIG. 21 is a two-dimensional scatter plot of the computer-aided dual-ratio metabolite discrimination technique identifying histologically confirmed combined steatosis and increased hepatic iron deposition.

Applying the normal threshold as well as the iron and fat discriminator functions, the dual-ratio metabolite discrimination technique achieved test characteristics differentiating normal hepatic parenchyma, shown in FIG. 18, from hepatic iron deposition, shown in FIG. 19, from steatosis hepatis, shown in FIG. 20, and from combined disease shown in FIG. 21 and Table 6.

TABLE 6

| | Dual-Ratio Technique | | | |
|---|---|---|---|---|
| | Steatosis (%) | Iron (%) | Combined (%) | Abnormal (%) |
| Sensitivity | 81.3 | 81.8 | 100.0 | 96.7 |
| Specificity | 98.2 | 100.0 | 94.1 | 97.6 |
| Accuracy | 94.4 | 97.1 | 94.4 | 97.2 |

FIG. 18 illustrates a two-dimensional scatter plot of the computer-aided dual-ratio metabolite discrimination technique identifying histologically confirmed normal hepatic parenchyma. The false color inlay shows predominantly normal hepatic voxels without disease-specific color encoding.

FIG. 19 illustrates a two-dimensional scatter plot of the computer-aided dual-ratio metabolite discrimination technique identifying histologically confirmed hepatic iron deposition. The false color inlay shows predominantly fat-containing hepatic voxels with disease-specific color encoding.

FIG. 20 illustrates a two-dimensional scatter plot of the computer-aided dual-ratio metabolite discrimination technique identifying histologically confirmed steatosis hepatis. The false color inlay shows predominantly iron-containing hepatic voxels with disease-specific color encoding.

FIG. 21 illustrates a two-dimensional scatter plot of the computer-aided dual-ratio metabolite discrimination technique identifying histologically confirmed combined steatosis and increased hepatic iron deposition. The false color inlay shows a relatively heterogeneous distribution of fat-containing, iron-containing, combined, and normal voxels.

Test characteristics for the computer-aided dual-ratio metabolite discrimination technique are show in Table 7 below.

TABLE 7

| | Computer-Aided Dual-Ratio Technique | | | |
|---|---|---|---|---|
| | Steatosis (%) | Iron (%) | Combined (%) | Abnormal (%) |
| Sensitivity | 87.5 | 90.9 | 100.0 | 96.7 |
| Specificity | 98.1 | 98.3 | 92.4 | 90.2 |
| Accuracy | 95.7 | 97.1 | 92.8 | 93.0 |

Both fatty liver disease and hepatic iron deposition impose an extraordinary oxidative stress on the liver. This can influence hepatic lipid and iron metabolism in a cross-dependent fashion. In particular, this oxidative stress may induce the augmentation of transferrin receptors (TfR1) and also lead to down-regulation of hepcidin (HAMP), a peptide hormone that inhibits intrahepatic iron transfer, which then eventually increases intestinal iron absorption as well as iron uptake into hepatocytes. The detection of each individual disease metabolite may prove essential in order to quantify disease severity and clarify disease component interdependencies.

In clinical scenarios of combined hepatic deposition disease, however, competing chemical shift phenomena and T2* effects undermine the detection of storage disease entities, as non-differentiable simultaneous signal losses occur on in-phase as well as opposed-phase MR series. Recent work performed in in vitro models has shown that the use of T1-weighted gradient dual echo MR imaging with two-point Dixon reconstruction may possess the capability to identify concurrent T2* effects and chemical shift phenomena, enabling the detection of combined disease. This study was performed in an in vivo patient population to assess the accuracy of the Dixon-based two-dimensional metabolite discrimination technique for detection and characterization of diffuse liver disease as compared to conventional one-dimensional approaches utilizing I/O ratios alone.

The single-ratio metabolite discrimination technique implemented in this study corroborated prior clinical assessments which showed the ability of multiecho imaging sequences to diagnose isolated steatosis hepatis and hepatic iron deposition. In general, increasing magnetic field strength results in more rapid T2* decay, while T2 relaxation time remains comparable. The doubling in precession frequency at 3 T compared to 1.5 T, in contrast, leads to a substantial narrowing of the interecho spacing between the T1-weighted in- and opposed-echo pairs, thereby potentially counteracting signal gains at higher magnetic field strengths. The I/O ratio thresholds which allowed differentiation between normal hepatic parenchyma, steatosis hepatis and hepatic iron deposition, were comparable at magnetic field strengths of both 1.5 T and 3 T. In vivo data shows that differentiation between normal hepatic parenchyma and combined disease may not be possible by an I/O ratio analysis alone, due to a complete overlap of I/O ratios characteristic for these states. This diagnostic dilemma was the main motivation for this in vivo assessment aiming to explore approaches for differentiation of diffuse hepatic deposition disease by T1-weight multiecho MR.

The in vivo implementation of the dual-ratio metabolite discrimination technique was based on analysis of both I/O and F/W signal intensity ratios extracted from ROIs placed in the right hepatic lobe. In clinical scenarios of fatty liver disease, the Dixon-based fat-vector series were more susceptible to free induction decay (FID) due to the shorter T2* relaxation of fat compared to water, while the Dixon-based water-vector series are less susceptible due to longer T2* relaxation time of water. In the dual-ratio approach, these effects manifest as enhanced differentiation of varying fat concentrations along the I/O axis, whereas variations along the F/W axis are somewhat attenuated. In contrast, clinical scenarios of hepatic iron deposition corresponded with stronger FID compared to fatty liver disease or normal liver parenchyma. Free induction decay-induced signal loss caused by the presence of paramagnetic iron is more pronounced on in-phase series due to longer echo times, and generally diminishes effects arising from fat/water cancellations. The calculation of fat-vector and water-vector series by means of subtraction/summation and subsequent calculation of F/W ratios results in amplified FID effects with enhanced differentiation of various iron concentrations along F/W axis, whereas variations along the I/O ratio axis persist, but are less evident.

The dual-ratio metabolite discrimination technique in accordance with the present subject matter showed equivalent or greater sensitivities and overall accuracies for all categories of storage disease, in comparison to the clinically established single-ratio technique. Most importantly, the dual-ratio technique was substantially more sensitive for detection of any disease state compare to the single-ratio technique, 96.7% vs. 70%. Additionally, the dual-ratio technique allows for detection of combined fatty liver and iron deposition, which was not possible with the traditional single-ratio technique.

The computer-aided dual-ratio metabolite discrimination approach can combine the tissue separating capabilities of I/O and F/W ratios with a voxel-by-voxel calculation algorithm resulting in a >3000-fold increase in sample size compared with the selection of a single ROI. For each storage disease category, the sensitivities achieved with the ROI-based dual-ratio technique were reproduced or even improved. A slight loss of specificity was observed, likely owing to the algorithm's VOI-choosing procedure and its inability to avoid areas of artifact in some cases, particularly breathing motion and parallel imaging artifacts, as well as inclusion of non-parenchymal structures located in the right hepatic lobe, such as portal and hepatic veins, which were more easily avoided when selecting ROIs manually. Importantly, the computer-aided dual-ratio diagnosis predictor was more sensitive than the single-ratio technique and at least as sensitive as the ROI-based dual-ratio technique, when considering each disease state individually.

The implementation of either the dual-ratio metabolite discrimination approach suggests a potential role as a gate-keeper to identify patients who may benefit from an extended exam protocol while undergoing the MR examination. Calculation times of less than a second per false-color overlay, averaging 26.3±6.6 s for the entire three-dimensional T1-weighted data series may allow an in-line implementation of this approach to be performed while the patient is still in the MR scanner before contrast administration has been initiated. Such an implementation may alert the MR technologist or radiologist to the presence of diffuse liver disease and allow the addition of tailored quantification sequences such as three-point Dixon imaging, T2* mapping, or single-voxel spectroscopy with automated seed-point definition during the same exam. The three-point Dixon or spectroscopic MR imaging techniques may be part of routine abdominal MR imaging protocols.

The false-color image series generated by the computer algorithm demonstrated a relatively heterogenous distribution of disease characteristics, especially in the case of combined storage disease. This emphasizes the potential pitfall for incorrect categorization of disease based on core biopsy alone due to sampling error inherent in the ability to evaluate only a small amount of tissue histopathologically. Non-invasive technique such as MR imaging allow for the assessment of a much larger portion of the organ in question and potentially may help to target liver core biopsies to extract a tissue sample representative of underlying diffuse liver disease. False-color images, furthermore, may simplify the gate-keeping potential of the two-dimensional approach for custom-tailoring MR protocols, as no calculations of I/O and F/W ratios have to be performed manually.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs may be implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

Features from one embodiment or aspect may be combined with features from any other embodiment or aspect in any appropriate combination. For example, any individual or collective features of method aspects or embodiments may be applied to apparatus, system, product, or component aspects of embodiments and vice versa.

While the embodiments have been described in connection with the various embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method of magnetic resonance imaging (MRI), the method comprising:
    receiving a plurality of MRI data signals representative of a region including a volume of interest (VOI);
    determining at least one subvolume within the VOI;
    generating a ratio pair (RP) cluster, wherein the RP cluster corresponds to the at least one sub volume;
    forming an RP cloud characterized according to a short axis length of the RP cluster by;
    determining an average distance between a center of the RP cloud to each RP along fat-only/water-only (F/W) and log in-phase/opposed-phase (I/O) axes;
    constructing a long axis vector for an ellipse from average distance vectors;
    determining a short axis vector perpendicular to the long axis vector;
    determining an average distance from the center of the RP cloud to each RP along the short axis vector; and
    selecting the clusters including a short axis length meeting a predetermined criterion;
    generating a chemical shift image of the at least one subvolume based on the RP cloud; and
    presenting the chemical shift image to a user.

2. The method of claim 1, wherein the MRI data signals comprise one of an in-phase data set, an opposed-phase data set, a fat only data set, and a water-only data set.

3. The method of claim 1, wherein the VOI includes at least a portion of a liver.

4. The method of claim 1, further comprising:
    identifying the VOI; and
    determining a plurality of subvolumes within the VOI, the determined subvolumes including the at least one subvolume, and
    wherein determining at least one subvlourne comprises determining the at least one subvolume based on a signal intensity of the subvolume.

5. the method in claim 1, wherein determining a state of the at least one subvolume comprises:
    comparing the at least one subvolume to model data of the VOI that corresponds to the at least one subvolume; and
    determining the state based on the comparison.

6. The method of claim 1, wherein the VOI includes at least a portion of a liver, and
    wherein determining a state of the at least one subvolume comprises:
        applying a fat-water separation technique to the at least one subvolume; and
        determining a liver deposition disease state based on applied fat-water separation technique.

7. The method of claim 6, wherein implementing a predetermined action comprises indicating the liver deposition disease state to a user.

8. The method of claim 6, wherein determining a liver deposition disease state comprises determining a level of one of liver fat and liver iron, and
    wherein implementing a predetermined action comprises indicating the level of the one of the liver fat and liver iron to a user.

9. The method of claim 1, wherein implementing a predetermined action comprises one of presenting an image of the at least one subvolume, presenting a recommendation, and modifying subsequent portions of the MRI scan.

10. the method of claim 1, further comprising applying a three-dimensional (3D) pulse sequence to the region of obtaining the MRI data signals.

11. The method of claim 10, further comprising processing the MRI data signals using a fat-water separation technique.

12. The method of claim 11, wherein forming an RP cloud comprises
    determining the center of the RP cloud.

13. The method of claim 12, wherein selecting the clusters comprises selecting the clusters including a short axis length that is less than or equal to 1 standard deviation below the mean of all short axis lengths for remaining clusters.

14. A system of magnetic resonance imaging (MRI), the system comprising:
    an interface configured to receive a plurality of MRI data signals representative of a region including a volume of interest (VOI);
    at least one computer configured to:
    determine at least one subvolume within the VOI;
    generate a ratio pair (RP) cluster, wherein the RP cluster corresponds to the at least one subvolume;
    form an RP cloud characterized according to a short axis length of the RP cluster by;
    determine an average distance between a center of the RP cloud to each RP along fat-only/water-only (F/W) and log in-phase/opposed-phase (I/O) axes;
    construct a long axis vector for an ellipse from average distance vectors;

determine a short axis vector perpendicular to the long axis vector;

determine an average distance from the center of the RP cloud to each RP along the short axis vector; and select the clusters including a short axis length meeting a predetermined criterion;

generate a chemical shift image of the at least one subvolume based on the RP cloud; and present the chemical shift image to a user.

15. The system of claim 14, wherein the MRI data signals comprise one of an in-phase data set, an opposed-phase data set, a fat-only data set, and a water-only data set.

16. The system of claim 14, wherein the VOI includes at least a portion of a liver.

17. The system of claim 14, wherein the at least one computer is configured to:

identify the VOI;

determine a plurality of subvolumes within the VOI, the determined subvolumes including the at least one subvolume; and determine the at least one subvolume based on a signal intensity of the subvolume.

18. The system of claim 14, wherein the at least one computer is configured to:

compare the at least one subvolume to model data of the VOI that corresponds to the at least one subvolume; and determine the state based on the comparison.

19. The system of claim 14, wherein the VOI includes at least a portion of a liver, and wherein the at least one computer is configured to:

apply a fat-water separation technique to the at least one subvolume; and determine a liver deposition disease state based on applied fat-water separation technique.

20. The system of claim 19, wherein the at least one computer is configured to indicate the liver deposition disease state to a user.

21. The system of claim 19, wherein the at least one computer is configured to:

determine a level of one of liver fat and liver iron; and indicate the level of the one of the liver fat and liver iron to a user.

22. The system of claim 14, wherein the predetermined action comprises one of present an image of the at least one subvolume, present a recommendation, and modifying subsequent portions of the MRI scan.

23. The system of claim 14, wherein the at least one computer is configured to apply a three-dimensional (3D) pulse sequence to the region for obtaining the MRI data signals.

24. The system of claim 23, wherein the at least one computer is configured to process the MRI data signals using a fat-water separation technique.

25. The system of claim 24, wherein the at least one computer is configured to determine a center of the RP cloud.

26. The system of claim 25, wherein the at least one computer is configured to select the clusters including a short axis length that is less than or equal to 1 standard deviation below the mean of all short axis lengths for remaining clusters.

* * * * *